United States Patent
Tagtow et al.

(12) 
(10) Patent No.: US 10,968,661 B2
(45) Date of Patent: Apr. 6, 2021

(54) LOCKING SYSTEM HAVING AN ELECTRONIC DEADBOLT

(71) Applicant: Amesbury Group, Inc., Amesbury, MA (US)

(72) Inventors: Gary E. Tagtow, Sioux Falls, SD (US); Michael Lee Anderson, Sioux Falls, SD (US); Tracy Lammers, Sioux Falls, SD (US); Bruce Hagemeyer, Pella, IA (US); Douglas John Criddle, Sioux Falls, SD (US)

(73) Assignee: Amesbury Group, Inc., Amesbury, MA (US)

( * ) Notice: Subject to any disclaimer, the term of this patent is extended or adjusted under 35 U.S.C. 154(b) by 736 days.

(21) Appl. No.: 15/239,718

(22) Filed: Aug. 17, 2016

(65) Prior Publication Data

US 2018/0051480 A1 Feb. 22, 2018

(51) Int. Cl.
*E05B 47/00* (2006.01)
*E05B 9/00* (2006.01)
(Continued)

(52) U.S. Cl.
CPC .......... *E05B 47/0012* (2013.01); *E05B 9/002* (2013.01); *E05B 9/02* (2013.01);
(Continued)

(58) Field of Classification Search
CPC .... E05B 47/0012; E05B 47/026; E05B 47/00; E05B 47/0001; E05B 2047/0023; E05B 2047/0048; E05B 2047/0058; E05B 2047/0069; E05B 2047/0095; E05B 2047/0014; E05B 2047/0016; E05B 2047/0017; E05B 2047/002; E05B 2047/0022; E05B 2047/0036; E05B 9/002;
(Continued)

(56) References Cited

U.S. PATENT DOCUMENTS 333,093 A 12/1885 Wright
419,384 A 1/1890 Towne
(Continued)

FOREIGN PATENT DOCUMENTS

AU 84928 12/2000
CA 2631521 A1 11/2009
(Continued)

OTHER PUBLICATIONS

Computer Generated Translation for EP2998483, Generated on Feb. 21, 2020, https://worldwide.espacenet.com/ (Year: 2020).*

(Continued)

*Primary Examiner* — Alyson M Merlino

(57) ABSTRACT

A motor with a shaft and a shaft axis is disposed within a housing. A lead screw has an axis and is rotatably mounted in the housing. A deadbolt linearly extends from the housing based on rotation of the lead screw. A gear set with a plurality of gears, each having an axis, is disposed in the housing and operably connects the motor and the lead screw. A circuit board is disposed within the housing and has a plurality of portions communicatively connected by a ribbon. Each portion is disposed substantially orthogonal to the motor shaft axis, the lead screw axis, and the plurality of gear axes.

15 Claims, 13 Drawing Sheets

(51) Int. Cl.
    *E05B 9/02* (2006.01)
    *H02K 7/116* (2006.01)
    *H02K 7/06* (2006.01)
    *E05B 15/10* (2006.01)
    *E05B 15/02* (2006.01)
    *E05B 17/00* (2006.01)
    *E05B 47/02* (2006.01)
    *E05B 63/14* (2006.01)

(52) U.S. Cl.
    CPC .......... *E05B 15/0205* (2013.01); *E05B 15/10* (2013.01); *E05B 17/0004* (2013.01); *E05B 47/026* (2013.01); *E05B 63/143* (2013.01); *H02K 7/06* (2013.01); *H02K 7/116* (2013.01); *E05B 2047/0023* (2013.01); *E05B 2047/0048* (2013.01); *E05B 2047/0058* (2013.01); *E05B 2047/0069* (2013.01); *E05B 2047/0095* (2013.01)

(58) Field of Classification Search
    CPC ...... E05B 9/02; E05B 17/0004; E05B 63/143; Y10T 292/0993; Y10T 292/1018; Y10T 292/1021; Y10T 70/7051; Y10T 70/7062; Y10T 70/7068; Y10T 70/7113; H05K 1/0277
    See application file for complete search history.

(56) References Cited

U.S. PATENT DOCUMENTS

| | | |
|---|---|---|
| 651,947 A | 6/1900 | Johnson |
| 738,280 A | 9/1903 | Bell et al. |
| 932,330 A | 8/1909 | Rotchford |
| 958,880 A | 5/1910 | Lawson |
| 966,208 A | 8/1910 | Hoes |
| 972,769 A | 10/1910 | Lark |
| 980,131 A | 12/1910 | Shean |
| 998,642 A | 7/1911 | Shean |
| 1,075,914 A | 10/1913 | Hoes |
| 1,094,143 A | 4/1914 | Hagstrom |
| 1,142,463 A | 6/1915 | Shepherd |
| 1,174,652 A | 3/1916 | Banks |
| 1,247,052 A | 11/1917 | Wilson |
| 1,251,467 A | 1/1918 | Blixt et al. |
| 1,277,174 A | 8/1918 | Bakst |
| 1,359,347 A | 11/1920 | Fleisher |
| 1,366,909 A | 2/1921 | Frommer |
| 1,368,141 A | 2/1921 | Hagstrom |
| 1,529,085 A | 3/1925 | Preble |
| 1,574,023 A | 2/1926 | Crompton et al. |
| 1,596,992 A | 8/1926 | Ognowicz |
| 1,646,674 A | 10/1927 | Angelillo |
| 1,666,654 A | 4/1928 | Hiering |
| 1,716,113 A | 6/1929 | Carlson |
| 1,974,253 A | 9/1934 | Sandor |
| 2,535,947 A | 12/1950 | Newell |
| 2,729,089 A | 1/1956 | Pelcin |
| 2,739,002 A | 3/1956 | Johnson |
| 2,862,750 A | 12/1958 | Minke |
| 2,887,336 A | 5/1959 | Meyer |
| 2,905,493 A | 9/1959 | Tocchetto |
| 3,064,462 A | 11/1962 | Ng et al. |
| 3,083,560 A | 4/1963 | Scott |
| 3,124,378 A | 3/1964 | Jackson |
| 3,162,472 A | 12/1964 | Rust |
| 3,214,947 A | 11/1965 | Wikkerink |
| 3,250,100 A | 5/1966 | Cornaro |
| 3,332,182 A | 7/1967 | Mark |
| 3,378,290 A | 4/1968 | Sekulich |
| 3,413,025 A | 11/1968 | Sperry |
| 3,437,364 A | 4/1969 | Walters |
| RE26,677 E | 10/1969 | Russell et al. |
| 3,498,657 A | 3/1970 | Fontana |
| 3,578,368 A | 5/1971 | Dupuis |
| 3,586,360 A | 6/1971 | Perrotta |
| 3,617,080 A | 11/1971 | Miller |
| 3,670,537 A | 6/1972 | Horgan, Jr. |
| 3,792,884 A | 2/1974 | Tutikawa |
| 3,806,171 A | 4/1974 | Fernandez |
| 3,899,201 A | 8/1975 | Paioletti |
| 3,904,229 A | 9/1975 | Waldo |
| 3,919,808 A | 11/1975 | Simmons |
| 3,940,886 A | 3/1976 | Ellingson, Jr. |
| 3,953,061 A | 4/1976 | Hansen et al. |
| 4,076,289 A | 2/1978 | Fellows et al. |
| 4,116,479 A | 9/1978 | Poe |
| 4,130,306 A | 12/1978 | Brkic |
| 4,132,438 A | 1/1979 | Guymer |
| 4,135,377 A | 1/1979 | Kleefeldt |
| 4,146,994 A | 4/1979 | Williams |
| 4,236,396 A | 12/1980 | Surko et al. |
| 4,273,368 A | 6/1981 | Tanaka |
| 4,283,882 A | 8/1981 | Hubbard |
| 4,288,944 A | 9/1981 | Donovan |
| 4,362,328 A | 12/1982 | Tacheny |
| 4,365,490 A | 12/1982 | Manzoni |
| 4,372,594 A | 2/1983 | Gater |
| 4,476,700 A | 10/1984 | King |
| 4,500,122 A | 2/1985 | Douglas |
| 4,547,006 A | 10/1985 | Castanier |
| 4,548,432 A | 10/1985 | Bengtsson |
| 4,593,542 A | 6/1986 | Rotondi et al. |
| 4,595,220 A | 6/1986 | Hanchett, Jr. |
| 4,602,490 A | 7/1986 | Glass |
| 4,602,812 A | 7/1986 | Bourne |
| 4,607,510 A | 8/1986 | Shanaan et al. |
| 4,633,688 A | 1/1987 | Beudat |
| 4,639,025 A | 1/1987 | Fann |
| 4,643,005 A | 2/1987 | Logas |
| 4,691,543 A | 9/1987 | Watts |
| 4,704,880 A | 11/1987 | Schlindwein |
| 4,717,909 A | 1/1988 | Davis |
| 4,754,624 A | 7/1988 | Fleming et al. |
| 4,768,817 A | 9/1988 | Fann |
| 4,893,849 A | 1/1990 | Schlack |
| 4,913,475 A | 4/1990 | Bushnell et al. |
| 4,949,563 A | 8/1990 | Gerard et al. |
| 4,961,602 A | 10/1990 | Pettersson |
| 4,962,653 A | 10/1990 | Kaup |
| 4,962,800 A | 10/1990 | Owiriwo |
| 4,964,660 A | 10/1990 | Prevot et al. |
| 4,973,091 A | 11/1990 | Paulson |
| 5,077,992 A | 1/1992 | Su |
| 5,092,144 A | 3/1992 | Fleming et al. |
| 5,114,192 A | 5/1992 | Toledo |
| 5,118,151 A | 6/1992 | Nicholas, Jr. et al. |
| 5,125,703 A | 6/1992 | Clancy et al. |
| 5,148,691 A | 9/1992 | Wallden |
| 5,171,050 A | 12/1992 | Mascotte |
| 5,172,944 A | 12/1992 | Munich et al. |
| 5,184,852 A | 2/1993 | O'Brien |
| 5,193,861 A | 3/1993 | Juga |
| 5,197,771 A | 3/1993 | Kaup et al. |
| 5,257,841 A | 11/1993 | Geringer |
| 5,265,452 A | 11/1993 | Dawson et al. |
| 5,290,077 A | 3/1994 | Fleming |
| 5,364,138 A | 11/1994 | Dietrich |
| 5,373,716 A | 12/1994 | MacNeil et al. |
| 5,382,060 A | 1/1995 | O'Toole et al. |
| 5,388,875 A | 2/1995 | Fleming |
| 5,394,718 A | 3/1995 | Hotzi |
| 5,404,737 A | 4/1995 | Hotzl |
| 5,441,315 A | 8/1995 | Kleefeldt |
| 5,456,503 A | 10/1995 | Russell et al. |
| 5,482,334 A | 1/1996 | Hotzl |
| 5,495,731 A | 3/1996 | Riznik |
| 5,496,082 A | 3/1996 | Zuckerman |
| 5,498,038 A | 3/1996 | Simon |
| 5,513,505 A | 5/1996 | Danes |
| 5,516,160 A | 5/1996 | Kajuch |
| 5,524,941 A | 6/1996 | Fleming |
| 5,524,942 A | 6/1996 | Fleming |

(56) References Cited

U.S. PATENT DOCUMENTS

| | | |
|---|---|---|
| 5,544,924 A | 8/1996 | Paster |
| 5,603,534 A | 2/1997 | Fuller |
| 5,609,372 A | 3/1997 | Ponelle |
| 5,620,216 A | 4/1997 | Fuller |
| 5,707,090 A | 1/1998 | Sedley |
| 5,716,154 A | 2/1998 | Miller et al. |
| 5,722,704 A | 3/1998 | Chaput et al. |
| 5,728,108 A | 3/1998 | Griffiths et al. |
| 5,735,559 A | 4/1998 | Frolov |
| 5,757,269 A | 5/1998 | Roth |
| 5,782,114 A | 7/1998 | Zeus et al. |
| 5,791,700 A | 8/1998 | Biro |
| 5,820,170 A | 10/1998 | Clancy |
| 5,820,173 A | 10/1998 | Fuller |
| 5,825,288 A | 10/1998 | Wojdan |
| 5,865,479 A | 2/1999 | Viney |
| 5,878,606 A | 3/1999 | Chaput et al. |
| 5,890,753 A | 4/1999 | Fuller |
| 5,896,763 A | 4/1999 | Dinkelborg et al. |
| 5,901,989 A | 5/1999 | Becken et al. |
| 5,906,403 A | 5/1999 | Bestler et al. |
| 5,911,763 A | 6/1999 | Quesada |
| 5,915,764 A | 6/1999 | MacDonald |
| 5,918,916 A | 7/1999 | Kajuch |
| 5,946,956 A | 9/1999 | Hotzl |
| 5,951,068 A | 9/1999 | Strong et al. |
| 5,979,199 A | 11/1999 | Elpern |
| 6,050,115 A | 4/2000 | Schroter et al. |
| 6,079,585 A | 6/2000 | Lentini |
| 6,089,058 A | 7/2000 | Elpern |
| 6,094,869 A | 8/2000 | Magoon et al. |
| 6,098,433 A | 8/2000 | Maniaci |
| 6,112,563 A | 9/2000 | Ramos |
| 6,116,067 A | 9/2000 | Myers |
| 6,120,071 A | 9/2000 | Picard |
| D433,916 S | 11/2000 | Frey |
| 6,148,650 A | 11/2000 | Kibble |
| 6,174,004 B1 | 1/2001 | Picard et al. |
| 6,196,599 B1 | 3/2001 | D'Hooge |
| 6,209,931 B1 | 4/2001 | Von Stoutenborough et al. |
| 6,217,087 B1 | 4/2001 | Fuller |
| 6,250,842 B1 | 6/2001 | Kruger |
| 6,257,030 B1 | 7/2001 | Davis, III et al. |
| 6,264,252 B1 | 7/2001 | Clancy |
| 6,266,981 B1 | 7/2001 | von Resch et al. |
| 6,282,929 B1 | 9/2001 | Eller et al. |
| 6,283,516 B1 | 9/2001 | Viney |
| 6,293,598 B1 | 9/2001 | Rusiana |
| 6,318,769 B1 | 11/2001 | Kang |
| 6,327,881 B1 | 12/2001 | Grundler et al. |
| 6,389,855 B2 | 5/2002 | Renz et al. |
| 6,441,735 B1 | 8/2002 | Marko |
| 6,443,506 B1 | 9/2002 | Su |
| 6,453,616 B1 | 9/2002 | Wright |
| 6,454,322 B1 | 9/2002 | Su |
| 6,457,751 B1 | 10/2002 | Hartman |
| 6,490,895 B1 | 12/2002 | Weinerman |
| 6,502,435 B2 | 1/2003 | Watts et al. |
| 6,516,641 B1 | 2/2003 | Segawa |
| 6,540,268 B2 | 4/2003 | Pauser |
| 6,564,596 B2 | 5/2003 | Huang |
| 6,568,726 B1 | 5/2003 | Caspi |
| 6,580,355 B1 | 6/2003 | Milo |
| 6,619,085 B1 * | 9/2003 | Hsieh .............. E05B 47/0012 292/144 |
| 6,637,784 B1 | 10/2003 | Hauber |
| 6,672,632 B1 | 1/2004 | Speed et al. |
| 6,688,656 B1 | 2/2004 | Becken |
| 6,733,051 B1 | 5/2004 | Cowper |
| 6,776,441 B2 | 8/2004 | Liu |
| 6,810,699 B2 | 11/2004 | Nagy |
| 6,813,916 B2 | 11/2004 | Chang |
| 6,871,451 B2 | 3/2005 | Harger et al. |
| 6,905,152 B1 | 6/2005 | Hudson |
| 6,929,293 B2 | 8/2005 | Tonges |
| 6,935,662 B1 | 8/2005 | Hauber et al. |
| 6,962,377 B2 | 11/2005 | Tonges |
| 6,971,686 B2 | 12/2005 | Becken |
| 6,994,383 B2 | 2/2006 | Morris |
| 7,000,959 B2 | 2/2006 | Sanders |
| 7,010,945 B2 | 3/2006 | Yu |
| 7,010,947 B2 | 3/2006 | Milo |
| 7,025,394 B1 | 4/2006 | Hunt |
| 7,032,418 B2 | 4/2006 | Martin |
| 7,052,054 B2 | 5/2006 | Luker |
| 7,083,206 B1 | 8/2006 | Johnson |
| 7,128,350 B2 | 10/2006 | Eckerdt |
| 7,152,441 B2 | 12/2006 | Friar |
| 7,155,946 B2 | 1/2007 | Lee et al. |
| 7,203,445 B2 | 4/2007 | Uchida |
| 7,207,199 B2 | 4/2007 | Smith et al. |
| 7,249,791 B2 | 7/2007 | Johnson |
| 7,261,330 B1 | 8/2007 | Hauber |
| 7,353,637 B2 | 4/2008 | Harger et al. |
| 7,404,306 B2 | 7/2008 | Walls et al. |
| 7,410,194 B2 | 8/2008 | Chen |
| 7,418,845 B2 | 9/2008 | Timothy |
| 7,513,540 B2 | 4/2009 | Hagemeyer et al. |
| 7,526,933 B2 | 5/2009 | Meekma |
| 7,634,928 B2 | 12/2009 | Hunt |
| 7,637,540 B2 | 12/2009 | Chiang |
| 7,677,067 B2 | 3/2010 | Riznik et al. |
| 7,686,207 B1 | 3/2010 | Jeffs |
| 7,707,862 B2 | 5/2010 | Walls et al. |
| 7,726,705 B2 | 6/2010 | Kim |
| 7,735,882 B2 | 6/2010 | Abdollahzadeh et al. |
| 7,748,759 B2 | 7/2010 | Chen |
| 7,856,856 B2 | 12/2010 | Shvartz |
| 7,878,034 B2 | 2/2011 | Alber et al. |
| 7,946,080 B2 | 5/2011 | Ellerton |
| 7,963,573 B2 | 6/2011 | Blomqvist |
| 8,161,780 B1 | 4/2012 | Huml |
| 8,182,002 B2 | 5/2012 | Fleming |
| 8,325,039 B2 | 12/2012 | Picard |
| 8,348,308 B2 | 1/2013 | Hagemeyer et al. |
| 8,376,414 B2 | 2/2013 | Nakanishi et al. |
| 8,376,415 B2 | 2/2013 | Uyeda |
| 8,382,166 B2 | 2/2013 | Hagemeyer et al. |
| 8,382,168 B2 | 2/2013 | Carabalona |
| 8,398,126 B2 | 3/2013 | Nakanishi et al. |
| 8,403,376 B2 * | 3/2013 | Greiner .............. E05B 47/0012 292/144 |
| 8,494,680 B2 | 7/2013 | Sparenberg et al. |
| 8,550,506 B2 | 10/2013 | Nakanishi |
| 8,567,631 B2 | 10/2013 | Brunner |
| 8,628,126 B2 | 1/2014 | Hagemeyer et al. |
| 8,646,816 B2 | 2/2014 | Dziurdzia |
| 8,839,562 B2 | 9/2014 | Madrid |
| 8,840,153 B2 | 9/2014 | Juha |
| 8,850,744 B2 | 10/2014 | Bauman et al. |
| 8,851,532 B2 | 10/2014 | Geringer |
| 8,876,172 B2 | 11/2014 | Denison |
| 8,899,635 B2 | 12/2014 | Nakanishi |
| 8,922,370 B2 | 12/2014 | Picard |
| 8,939,474 B2 | 1/2015 | Hagemeyer et al. |
| 9,428,937 B2 | 8/2016 | Tagtow et al. |
| 9,482,035 B2 | 11/2016 | Wolf |
| 9,512,654 B2 | 12/2016 | Armari et al. |
| 9,605,444 B2 | 3/2017 | Rickenbaugh |
| 9,637,957 B2 | 5/2017 | Hagemeyer et al. |
| 9,758,997 B2 | 9/2017 | Hagemeyer et al. |
| 9,765,550 B2 | 9/2017 | Hemmingsen et al. |
| 9,790,716 B2 | 10/2017 | Hagemeyer et al. |
| 9,822,552 B2 | 11/2017 | Eller et al. |
| 10,174,522 B2 | 1/2019 | Denison |
| 10,240,366 B2 | 3/2019 | Sotes Delgado |
| 10,246,914 B2 | 4/2019 | Sieglaar |
| 10,822,836 B2 | 11/2020 | Nakasone |
| 2002/0104339 A1 | 8/2002 | Saner |
| 2003/0024288 A1 * | 2/2003 | Gokcebay ............ E05B 63/06 70/432 |
| 2003/0159478 A1 | 8/2003 | Nagy |
| 2004/0004360 A1 | 1/2004 | Huang |

(56) References Cited

U.S. PATENT DOCUMENTS

| | | |
|---|---|---|
| 2004/0011094 A1* | 1/2004 | Hsieh .................. E05B 47/026 70/57 |
| 2004/0066046 A1 | 4/2004 | Becken |
| 2004/0089037 A1* | 5/2004 | Chang ................ E05B 47/0012 70/257 |
| 2004/0107746 A1 | 6/2004 | Chang |
| 2004/0107747 A1 | 6/2004 | Chang |
| 2004/0112100 A1 | 6/2004 | Martin |
| 2004/0145189 A1 | 7/2004 | Liu |
| 2004/0227349 A1 | 11/2004 | Denys |
| 2004/0239121 A1 | 12/2004 | Morris |
| 2005/0029345 A1 | 2/2005 | Waterhouse |
| 2005/0044908 A1 | 3/2005 | Min |
| 2005/0050928 A1 | 3/2005 | Frolov |
| 2005/0103066 A1 | 5/2005 | Botha et al. |
| 2005/0144848 A1 | 7/2005 | Harger et al. |
| 2005/0166647 A1 | 8/2005 | Walls |
| 2005/0180562 A1 | 8/2005 | Chiang |
| 2005/0229657 A1 | 10/2005 | Johansson et al. |
| 2006/0043742 A1 | 3/2006 | Huang |
| 2006/0071478 A1 | 4/2006 | Denys |
| 2006/0076783 A1 | 4/2006 | Tsai |
| 2006/0150516 A1 | 7/2006 | Hagemeyer |
| 2006/0208509 A1 | 9/2006 | Bodily |
| 2007/0068205 A1 | 3/2007 | Timothy |
| 2007/0080541 A1 | 4/2007 | Fleming |
| 2007/0113603 A1 | 5/2007 | Polster |
| 2007/0170725 A1 | 7/2007 | Speyer et al. |
| 2007/0259551 A1 | 11/2007 | Rebel |
| 2008/0000276 A1 | 1/2008 | Huang |
| 2008/0001413 A1 | 1/2008 | Lake |
| 2008/0087052 A1 | 4/2008 | Abdollahzadeh et al. |
| 2008/0092606 A1 | 4/2008 | Meekma |
| 2008/0093110 A1* | 4/2008 | Bagung .................. H05K 1/189 174/254 |
| 2008/0141740 A1 | 6/2008 | Shvartz |
| 2008/0150300 A1 | 6/2008 | Harger et al. |
| 2008/0156048 A1 | 7/2008 | Topfer |
| 2008/0156049 A1 | 7/2008 | Topfer |
| 2008/0157544 A1 | 7/2008 | Phipps |
| 2008/0178530 A1 | 7/2008 | Ellerton et al. |
| 2008/0179893 A1 | 7/2008 | Johnson |
| 2008/0184749 A1 | 8/2008 | Alber et al. |
| 2008/0191499 A1 | 8/2008 | Stein |
| 2009/0064737 A1 | 3/2009 | Fan |
| 2009/0078011 A1 | 3/2009 | Avni |
| 2009/0218832 A1 | 9/2009 | Mackle |
| 2009/0314042 A1 | 12/2009 | Fan |
| 2009/0315669 A1 | 12/2009 | Lang |
| 2010/0107707 A1 | 5/2010 | Viviano |
| 2010/0154490 A1 | 6/2010 | Hagemeyer et al. |
| 2010/0213724 A1 | 8/2010 | Uyeda |
| 2010/0236302 A1 | 9/2010 | Uyeda |
| 2010/0313612 A1 | 12/2010 | Eichenstein |
| 2010/0327610 A1 | 12/2010 | Nakanishi et al. |
| 2011/0056254 A1 | 3/2011 | Tsai |
| 2011/0198867 A1 | 8/2011 | Hagemeyer et al. |
| 2011/0289987 A1 | 12/2011 | Chiou et al. |
| 2011/0314877 A1 | 12/2011 | Fang |
| 2012/0001443 A1 | 1/2012 | Mitchell |
| 2012/0146346 A1 | 6/2012 | Hagemeyer et al. |
| 2012/0235428 A1* | 9/2012 | Blacklaws ............ E05C 19/004 292/338 |
| 2012/0306220 A1 | 12/2012 | Hagemeyer et al. |
| 2013/0019643 A1 | 1/2013 | Tagtow et al. |
| 2013/0081251 A1* | 4/2013 | Hultberg ............... E05B 47/026 29/428 |
| 2013/0140833 A1 | 6/2013 | Hagemeyer et al. |
| 2013/0152647 A1 | 6/2013 | Terei et al. |
| 2013/0200636 A1 | 8/2013 | Hagemeyer et al. |
| 2013/0234449 A1 | 9/2013 | Dery et al. |
| 2013/0276488 A1* | 10/2013 | Haber ................ E05B 47/0012 70/57.1 |
| 2014/0060127 A1 | 3/2014 | Hemmingsen et al. |
| 2014/0125068 A1 | 5/2014 | Hagemeyer et al. |
| 2014/0159387 A1 | 6/2014 | Hagemeyer et al. |
| 2014/0182343 A1 | 7/2014 | Talpe |
| 2014/0367978 A1 | 12/2014 | Geringer |
| 2015/0075233 A1* | 3/2015 | Pluta .................... E05B 47/026 70/129 |
| 2015/0089804 A1 | 4/2015 | Picard |
| 2015/0114176 A1 | 4/2015 | Bisang |
| 2015/0170449 A1 | 6/2015 | Chandler, Jr. |
| 2015/0176311 A1 | 6/2015 | Picard |
| 2015/0252595 A1 | 9/2015 | Hagemeyer et al. |
| 2016/0083976 A1 | 3/2016 | Rickenbaugh |
| 2016/0108650 A1 | 4/2016 | Hagemeyer et al. |
| 2016/0369525 A1 | 12/2016 | Tagtow et al. |
| 2018/0023320 A1 | 1/2018 | McKibben |
| 2018/0051478 A1 | 2/2018 | Tagtow |
| 2018/0119462 A1 | 5/2018 | Hagemeyer |
| 2018/0155962 A1 | 6/2018 | Mitchell et al. |
| 2018/0298642 A1 | 10/2018 | Tagtow |
| 2018/0313116 A1 | 11/2018 | Criddle |
| 2019/0024437 A1 | 1/2019 | Tagtow |
| 2019/0032368 A1 | 1/2019 | Welbig et al. |
| 2019/0277062 A1 | 9/2019 | Tagtow |
| 2020/0354990 A1 | 11/2020 | Tagtow |

FOREIGN PATENT DOCUMENTS

| | | |
|---|---|---|
| CN | 1243908 | 2/2000 |
| CN | 2554288 Y | 6/2003 |
| CN | 2595957 Y | 12/2003 |
| CN | 2660061 | 12/2004 |
| CN | 201031548 Y | 3/2008 |
| CN | 202047652 U | 11/2011 |
| DE | 1002656 | 2/1957 |
| DE | 1584112 | 9/1969 |
| DE | 2639065 | 3/1977 |
| DE | 3032086 | 3/1982 |
| DE | 3836693 | 5/1990 |
| DE | 9011216 | 10/1990 |
| DE | 4224909 | 2/1993 |
| DE | 29807860 | 8/1998 |
| DE | 20115378 U1 | 11/2001 |
| DE | 10253240 | 5/2004 |
| DE | 202012002743 U1 | 4/2012 |
| DE | 202013000920 U1 | 4/2013 |
| DE | 202013000921 U1 | 4/2013 |
| DE | 202013001328 U1 | 5/2013 |
| EP | 0007397 A1 | 2/1980 |
| EP | 0231042 A2 | 8/1987 |
| EP | 0268750 | 6/1988 |
| EP | 341173 | 11/1989 |
| EP | 359284 | 3/1990 |
| EP | 661409 | 7/1995 |
| EP | 792987 | 9/1997 |
| EP | 1106761 | 6/2001 |
| EP | 1283318 | 2/2003 |
| EP | 1449994 | 8/2004 |
| EP | 1574642 | 9/2005 |
| EP | 1867817 | 12/2007 |
| EP | 2128362 | 12/2009 |
| EP | 2273046 A2 | 1/2011 |
| EP | 2339099 A1 | 6/2011 |
| EP | 2450509 A2 | 5/2012 |
| EP | 2581531 A1 | 4/2013 |
| EP | 2584123 A1 | 4/2013 |
| EP | 2584124 A2 | 4/2013 |
| EP | 2998483 A1 * | 3/2016 ......... E05B 47/0615 |
| EP | 3091152 A1 | 11/2016 |
| FR | 363424 | 7/1906 |
| FR | 370890 | 2/1907 |
| FR | 21883 E | 4/1921 |
| FR | 1142316 | 3/1957 |
| FR | 1162406 A | 9/1958 |
| FR | 1201087 | 12/1959 |
| FR | 2339723 | 9/1977 |
| FR | 2342390 | 9/1977 |
| FR | 2344695 | 10/1977 |
| FR | 2502673 | 10/1982 |
| FR | 2848593 B1 | 2/2005 |

(56) References Cited

FOREIGN PATENT DOCUMENTS

| | | |
|---|---|---|
| FR | 3017641 | 8/2015 |
| GB | 226170 | 4/1925 |
| GB | 264373 A | 1/1927 |
| GB | 583655 | 12/1946 |
| GB | 612094 A | 11/1948 |
| GB | 1498849 | 1/1978 |
| GB | 1575900 | 10/1980 |
| GB | 2051214 | 1/1981 |
| GB | 2076879 | 12/1981 |
| GB | 2115055 A | 9/1983 |
| GB | 2122244 | 1/1984 |
| GB | 2126644 | 3/1984 |
| GB | 2134170 | 8/1984 |
| GB | 2136045 | 9/1984 |
| GB | 2168747 | 6/1986 |
| GB | 2196375 | 4/1988 |
| GB | 2212849 | 8/1989 |
| GB | 2225052 | 5/1990 |
| GB | 2230294 | 10/1990 |
| GB | 2242702 | 10/1991 |
| GB | 2244512 | 12/1991 |
| GB | 2265935 | 10/1993 |
| GB | 2270343 | 3/1994 |
| GB | 2280474 | 2/1995 |
| GB | 2318382 A | 4/1998 |
| GB | 2364545 | 1/2002 |
| GB | 2496911 A | 5/2013 |
| IT | 614960 | 1/1961 |
| JP | 64-083777 A | 3/1989 |
| JP | 2003343141 | 12/2003 |
| JP | 2006112042 A | 4/2006 |
| JP | 2008002203 A | 1/2008 |
| KR | 2011094706 A | 8/2011 |
| NL | 8105627 | 7/1983 |
| SE | 309372 | 3/1969 |
| WO | 02/33202 | 4/2002 |
| WO | 2007/104499 | 9/2007 |
| WO | 2010071886 | 6/2010 |
| WO | 2015/079290 A1 | 6/2015 |
| WO | WO-2015079290 A1 * | 6/2015 ........... E05B 47/026 |

OTHER PUBLICATIONS

"Intercity Locks—For All Your Security Needs—Fast", http://www.directlocks.co.uk/locks-multipoint-locks-c-123_96.html, accessed Oct. 27, 2011, original publication date unknown, 3 pgs.

"Intercity Locks—For All Your Security Needs—Fast", http://www.directlocks.co.uk/locks-multipoint-locks-c-123_96.html?page=2&sort=2A, accessed Oct. 27, 2011, original publication date unknown, 3 pgs.

"Intercity Locks—For All Your Security Needs—Fast", http://www.directlocks.co.uk/locks-multipoint-locks-c-123_96.html?page=3&sort=2A, accessed Oct. 27, 2011, original publication date unknown, 3 pgs.

"LocksOnline.co.uk: Premier Supplier of Security Products", http://www.locksonline.co.uk/acatalog/Maco_multipoint_lock_2_cams_2_shootbolt_attachment.html, accessed Oct. 27, 2011, original publication date unknown, 5 pgs.

"LocksOnline.co.uk: Premier Supplier of Security Products", http://www.locksonline.co.uk/acatalog/upvc_Locks.html, accessed Oct. 27, 2011, original publication date unknown, 6 pgs.

"UPVC Window Hardware and uPVC Door Hardware online", http://www.upvc-hardware.co.uk/, accessed Oct. 27, 2011, original publication date unknown, 2 pgs.

PCT Invitation to Pay Additional Fees in PCT Application PCT/US2017/047348, dated Nov. 15, 2017, 12 pages.

Doorking.com—Electric Locks—Strikes and Deadbolts; printed from https://www.doorking.com/access-control/electric-locks-strikes-deadbolts, 2 pages, Feb. 2016.

Magneticlocks.net—Electric Strikes and Deadbolts; printed from https://www.magneticlocks.net/electric-strikes-and-deadbolts/electric-strikes.html, 8 pages, Feb. 2016.

Sdcsecurity.com—Latch and Deadbolt Monitoring Strikes; printed from http://www.sdcsecurity.com/monitor-strike-kits2.htm, 2 pages, Feb. 2016.

PCT International Search Report and Written Opinion in International Application PCT/US2017/047348, dated Jan. 15, 2018, 19 pages.

* cited by examiner

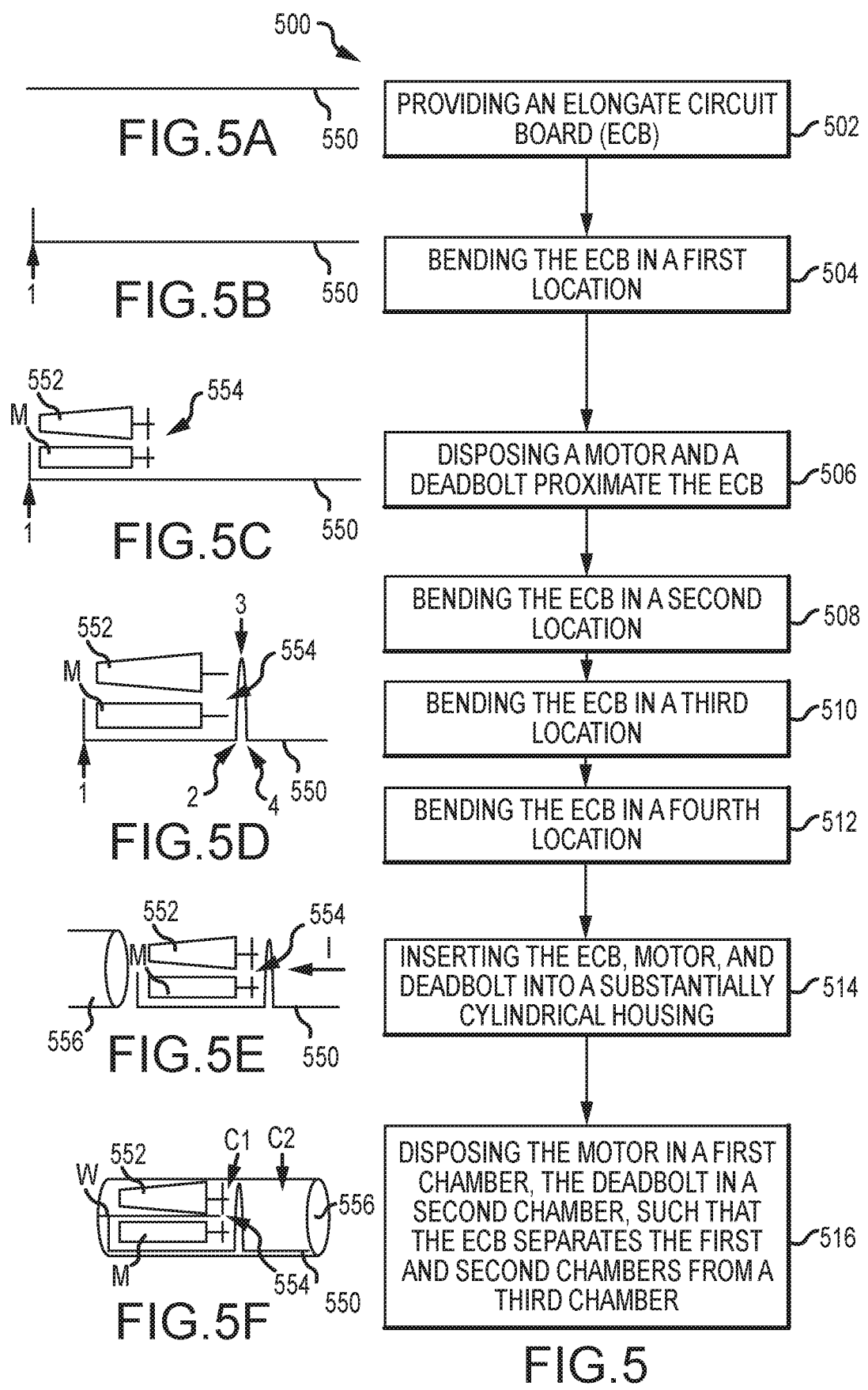

LOCKING SYSTEM HAVING AN ELECTRONIC DEADBOLT

INTRODUCTION

Deadbolts are operated by a user (e.g., with a key on an outside of the door or a thumbturn on the inside of the door) to secure the door against unwanted intrusions. Motorized deadbolts are also available, but these can display disadvantages. For example, it can often be difficult to determine whether the door is actually locked without attempting to open the door. This can cause the door to be breached if the user believes it to be locked when that is, in fact, not so.

SUMMARY

In one aspect, the technology relates to an apparatus having: a housing; a motor having a motor shaft having a motor shaft axis, wherein the motor is disposed in the housing; a lead screw having a lead screw axis, wherein the lead screw is rotatably mounted in the housing; a deadbolt configured to be linearly extended from the housing based on a rotation of the lead screw; a gear set having a plurality of gears, wherein each of the plurality of gears includes a gear axis, and wherein the gear set is disposed in the housing and operably connecting the motor and the lead screw; and a circuit board having a plurality of portions communicatively connected by a ribbon, wherein the circuit board is disposed within the housing, and wherein the plurality of portions are each disposed substantially orthogonal to the motor shaft axis, the lead screw axis, and the plurality of gear axes. In an embodiment, the apparatus further includes a power source disposed within the housing. In another embodiment, the power source includes a battery having a first pole disposed at a first end of the battery and a second pole disposed at a second end of the battery, wherein the poles define a battery axis substantially orthogonal to the plurality of circuit board portions. In yet another embodiment, the apparatus further includes a motor contact connected to at least one of the circuit board portions with a motor contact ribbon; and a battery contact connected to at least one of the circuit board portions with a battery contact ribbon. In still another embodiment, the motor contact lead is connected to a first circuit board portion, and wherein the battery contact lead is connected to a second circuit board of the circuit.

In another embodiment of the above aspect, the motor contact lead is connected to the first circuit board portion with a motor ribbon and the battery contact lead is connected to the second circuit board portion with a battery ribbon. In an embodiment, the apparatus further includes a communication module disposed between the plurality of circuit board portions and connected to at least one of the plurality of circuit board portions. In another embodiment, the battery includes a plurality of batteries, wherein each battery axis of the plurality of batteries is disposed parallel to each other. In yet another embodiment, the apparatus further includes a sensor disposed on at least one of the plurality of circuit board portions and configured to detect a rotation of the lead screw.

In another aspect, the technology relates to an apparatus having: a substantially cylindrical housing having a housing axis and defining a motor chamber, a deadbolt chamber, and a battery chamber, wherein each of the motor chamber, the deadbolt chamber, and the battery chamber each includes a largest linear dimension substantially aligned with the housing axis, and wherein the motor chamber and the deadbolt chamber are separated from the battery chamber by at least a portion of a circuit board. In an embodiment, the portion of the circuit board system includes a pair of parallel portions connected by a ribbon. In another embodiment, the circuit board further includes a motor contact disposed in the motor chamber and a battery contact disposed in the battery chamber. In yet another embodiment, the apparatus further includes a motor contact lead connecting the motor contact to a first one of the pair of parallel portions disposed proximate the motor chamber and deadbolt chamber, and a battery contact flexible connecting the battery contact to a second one of parallel portions disposed proximate the battery chamber. In still another embodiment, the apparatus further includes a leadscrew and a deadbolt at least partially disposed in the deadbolt chamber and operably connected to the lead screw such that a rotation of the lead screw extends the deadbolt away from the first one of the pair of parallel portions.

In another embodiment of the above aspect, the apparatus further includes a sensor disposed on the first one of the pair of parallel portions, wherein the sensor is configured to detect a rotation of the lead screw. In an embodiment, the apparatus further includes a motor disposed in the motor chamber. In another embodiment, the apparatus further includes a gear set operably connecting the motor and the lead screw.

In another aspect, the technology relates to a method of manufacturing a lock having a substantially cylindrical housing defining a plurality of chambers, an open end, and an elongate circuit board, the method including: inserting a first contact of the elongate circuit board into a first one of the plurality of chambers; bending the elongate circuit board at a first location and inserting the elongate circuit board within the housing so as to separate the first chamber of the plurality of chambers from a second chamber of the plurality of chambers; and bending the elongate circuit board at a second location so as to form the elongate circuit board into two substantially parallel portions. In an embodiment, the method further includes installing a deadbolt in the first chamber of the plurality of chambers and installing a motor in a third chamber of the plurality of chambers. In another embodiment, the method further includes bending the elongate circuit board in a third location.

BRIEF DESCRIPTION OF THE DRAWINGS

There are shown in the drawings, examples which are presently preferred, it being understood, however, that the technology is not limited to the precise arrangements and instrumentalities shown.

FIG. 2C is a perspective view of a circuit board for the electronic keeper of FIGS. 2A and 2B.

FIG. 4C is a perspective view of a circuit board for the electronic keeper of FIGS. 4A and 4B.

FIG. 5 depicts a method of manufacturing an electronic deadbolt.

FIGS. 5A-5F depict schematic side views of components of the electronic deadbolt system at various stages of manufacture.

DETAILED DESCRIPTION

Figure 1A:
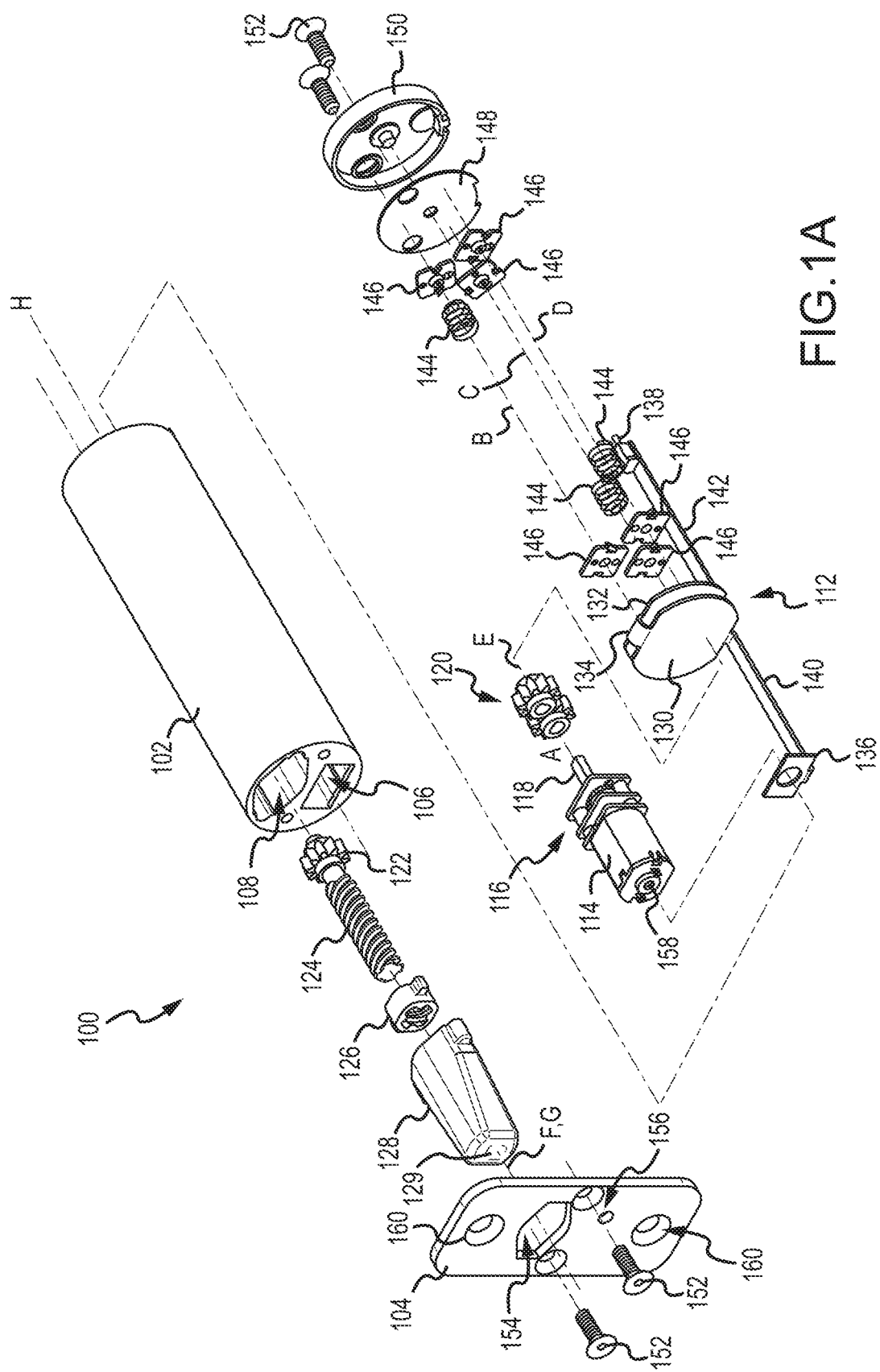
FIGS. 1A and 1B are exploded perspective and partial perspective views, respectively, of an electronic deadbolt system.
Figure 1B:
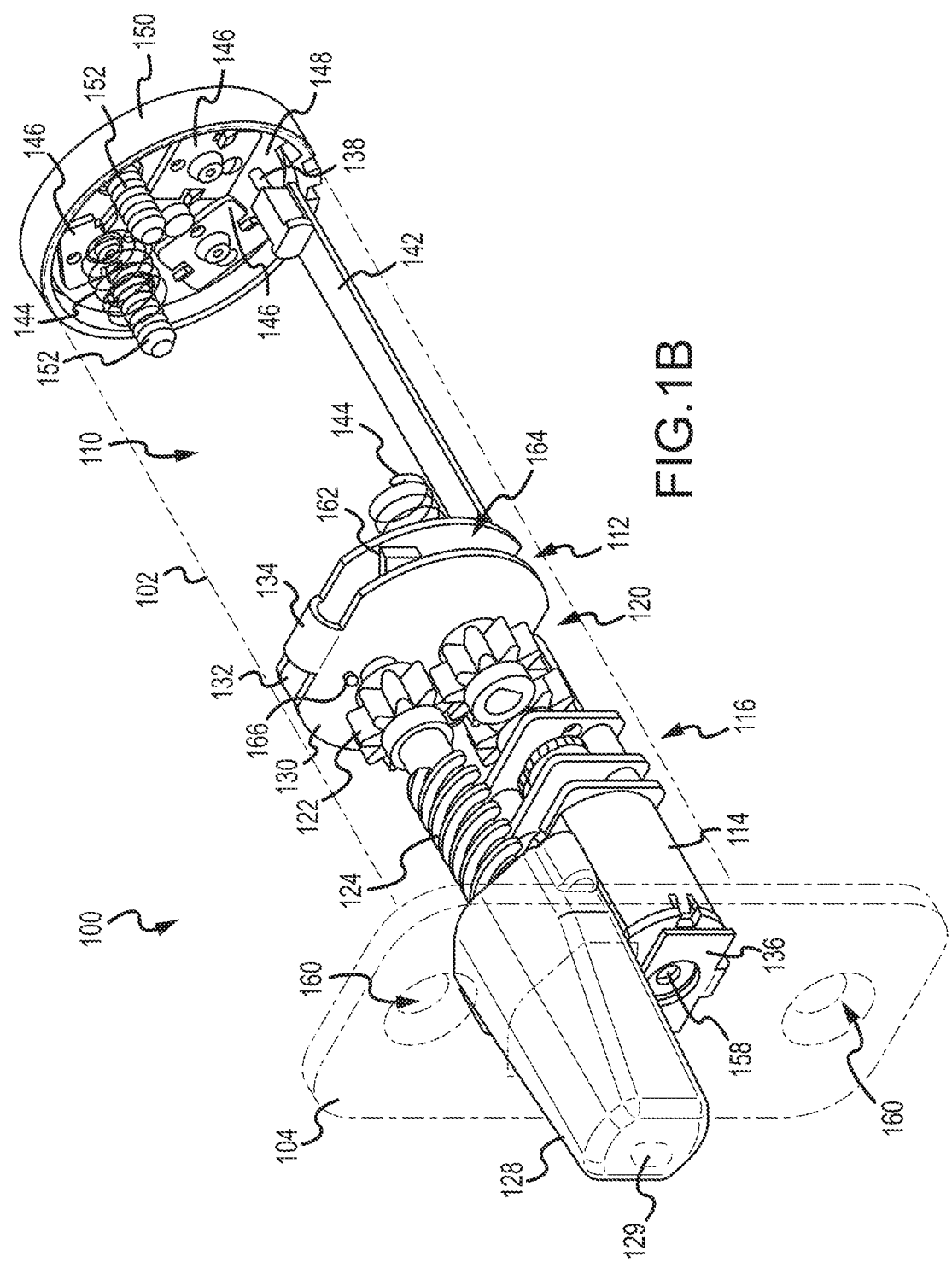

FIGS. 1A and 1B are exploded perspective and partial perspective views, respectively, of an electronic deadbolt system 100 and are described concurrently. In FIG. 1B, certain components, e.g., a housing 102 and a face plate 104, are depicted in dashed lines to depict more clearly the assembled components contained within the deadbolt system 100. The housing 102 defines a motor chamber 106, a deadbolt chamber 108, and a battery chamber 110. The motor chamber 106 and the deadbolt chamber 108 may be combined into a single chamber, if required or desired. Internal structures within the housing 102 that separate the motor chamber 106 from the deadbolt chamber 108 are not depicted in FIG. 1B. The motor chamber 106 and the deadbolt chamber 108 are separated from the battery chamber 110 by portions of a circuit board 112, as described in more detail below. The motor chamber 106 is configured to receive a motor 114 that includes a motor shaft having an axis that is coaxial with drive system axis A. The motor 114 may be an off-the-shelf unit that includes an integral gear set 116. This gear set 116 may have a drive axis 118 that drives an additional transfer gear set 120, which includes a lead screw drive gear 122 that is disposed in the deadbolt chamber 108. As such, the transfer gear set 120 spans from the motor chamber 106 to the deadbolt chamber 108. In another example, the integral gear set 116 need not be utilized, and the motor shaft may directly drive a gear set such as transfer gear set 120. The lead screw drive gear 122 drives a lead screw 124 that includes a nut 126 that connects the lead screw 124 to a deadbolt 128, such that rotation of the lead screw 124 translates into linear movement of the deadbolt 128. Thus, rotation of the lead screw 124 can extend and retract the deadbolt 128 from the housing 102. The deadbolt 128 may include, on an outer surface thereof, or embedded therein, an RFID chip 129, the function of which is described in further detail below.

The circuit board 112 includes a number of portions that allow it to be fitted into the housing 102 so as to conserve internal space thereof. For example, the circuit board 112 includes a first portion 130 and a second portion 132 connected by a flexible substrate portion or live hinge 134. These first 130 and second portions 132 are disposed between the battery chamber 110 and the motor and deadbolt chambers 106, 108. The circuit board 112 further includes a motor contact 136 and a battery contact 138, each of which are connected to one of the first and second portions 130, 132 via a lead ribbon 140, 142 of board substrate which may be flexible or rigid. The lead ribbons 140, 142 allow the motor and battery contacts 136, 138 to extend to the opposite ends of their respective chambers 106, 110. The battery chamber 110 includes a number of discrete battery contacts in the form of springs 144 and contact plates 146, as known in the art. In the depicted example, springs 144 and contact plates 146 for three "AA" batteries are depicted, although other battery types, arrangements, and power sources may be utilized. A contact plate 148 is disposed at an end of the battery chamber 110 and is configured to contact the battery contact 138 so as to form a complete power circuit therebetween.

An end plate 150 may be secured to the end of the housing 102 with one or more screws 152 to secure the battery chamber 110. Although not depicted, one or more electrical wires may exit the housing 102, e.g., proximate the end plate 150, so as to allow the deadbolt system 100 to be powered, alternatively or additionally, by a remote power source, such as building power, a remote battery, or other source. Control wiring to a remote controller may also be present. These wires may be connected at or near the battery contact 138. At an opposite end of the housing 102, the faceplate 104 may be secured with one or more screws 152. The faceplate 104 defines a deadbolt opening 154 for allowing passage of the deadbolt 128 and an LED opening 156 to allow a user to view an LED 158 disposed on the end of the motor 114, which may be indicative of status condition, lock condition, battery power condition, or other conditions. Further, the faceplate 104 may define one or more openings 160 configured to receive screws 152 to secure the deadbolt system 100 to a door panel.

The deadbolt system 100 depicted in FIGS. 1A and 1B is constructed and configured in a manner that reduces overall space, eases installation (even by untrained purchasers), and limits end-user access to critical internal components. With regard to reducing space, the elongate elements of the deadbolt are configured so as to have parallel axes (e.g., rotational axes). For example, drive system axis A is parallel to the axes of each battery (depicted as axes B, C, D in FIG. 1A). The batteries are not depicted, but their axes are defined by the positive and negative poles disposed along the identified lines B, C, and D. These axes are also parallel to the axes of each gear of the transfer gear set 120. A single axis E is depicted in FIG. 1A, although each gear of the gear set 120 has its own axis. Other parallel axes include axes F and G, which are associated with the lead screw 124 and the deadbolt 128, respectively, and are also coaxial. All of the above-identified axes are also parallel to the axis H of the housing 102. By arranging these elongate elements such that the axes A-H are parallel, circumference of the housing 102 may be reduced, which reduces overall size of the deadbolt system 100 and the space that it occupies.

Overall size of the deadbolt system 100 is further reduced by disposing the first and second portions 130, 132 of the circuit board 112 parallel to each other, and between the battery chamber 110 and the combined location of the motor chamber 106 and the deadbolt chamber 108. This configuration provides for a significant available area on the circuit board 112 to be located within the housing 102. Additionally, the location of the circuit board 112, substantially orthogonal to the axes A-H, prevents end-user access to the motor chamber 106 and the deadbolt chamber 108. Instead, the end-user would only have access to the battery chamber 110, e.g., via the end cap 150, to replace the batteries therein. This prevents potential end-user tampering with movable components of the deadbolt system 100, which might void the warranty, cause damage, or allow for debris infiltration into those internal volumes. Further space within the housing 102 is saved by disposing the ribbons 140, 142 so as to be substantially parallel to the axes A-H.

In examples, the housing 102 may be cylindrical with a maximum diameter of about one inch, one and one-quarter inch, or one and one-half inch or more. Such small diameters are possible because the largest linear dimension of each of chambers 106, 108, 110 are substantially aligned with the housing axis H. Such diameters allow the use of readily-available drill bits to drill a door panel so as to install the deadbolt system 100. Thus, this simplifies installation, even by inexperienced end-users. As such, the deadbolt system 100 (and one or more of the keepers described below) may be sold as a kit containing a deadbolt and keeper, as required or desired for a particular application, to be installed by an end-user (e.g., a homeowner).

FIG. 1B depicts the deadbolt system 100 with the housing 102 depicted transparent for clarity. This figure is used to describe further aspects of the circuit board 112 and other internal components related thereto. The circuit board 112 is a substrate on which is mounted a number of components utilized to control the deadbolt system 100. For example, the circuit board 112 may include a communication module 162, e.g., disposed on the second portion 132 thereof. By locating the communication module 162 or other components in a void 164 defined by the two parallel first and second portions 130, 132 of the circuit board 112, these modules and elements may be protected from damage or tampering. On the first portion 130, a sensor 166 is disposed so as to detect a rotational condition or position of the lead screw drive gear 122 (and therefore, ultimately, a position of the deadbolt 128). As the lead screw drive gear 122 rotates, the sensor 166 detects this rotation and sends a signal to a processor (not shown). This signal may be used in a number of ways, for example, to confirm that the deadbolt is extended, detect an operational condition in the deadbolt system 100, such as a failure of complete deadbolt 128 extension, or other purposes as required or desired for a particular application.

Figure 1C:
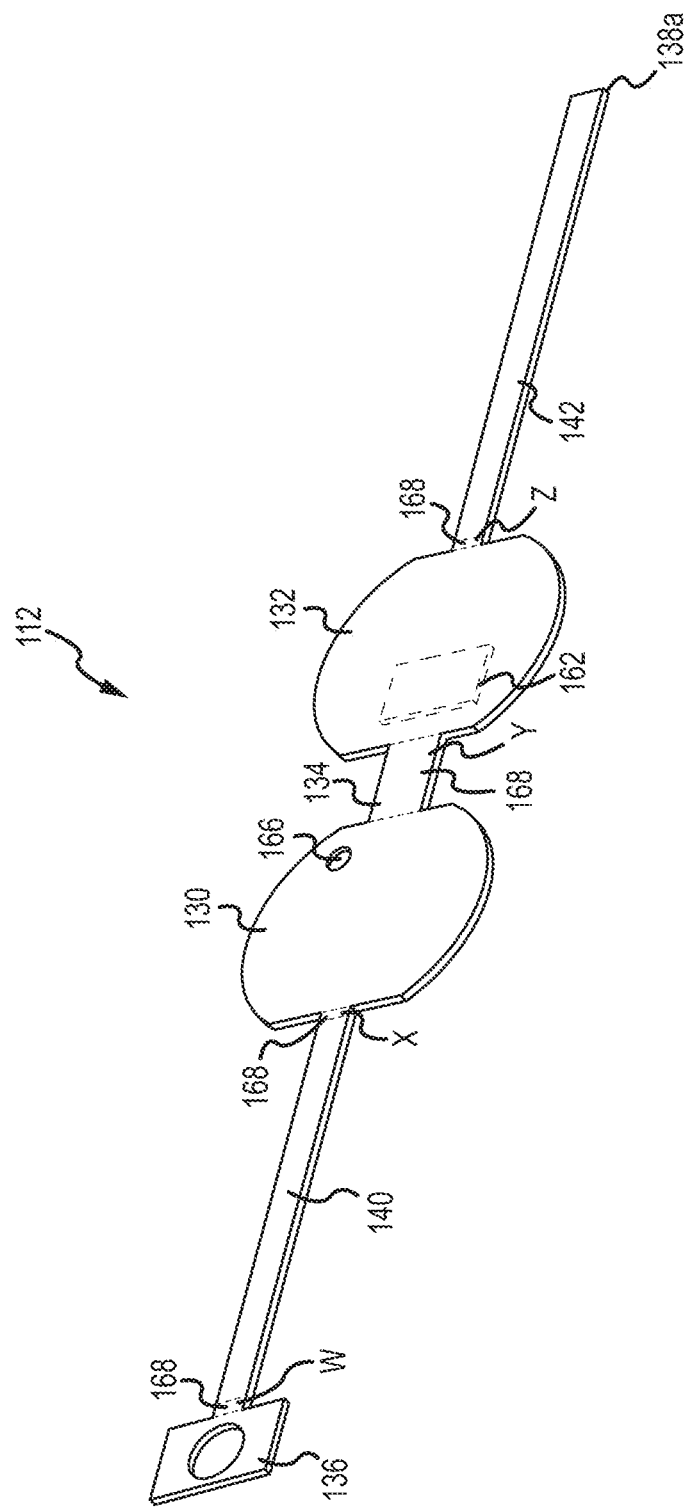
FIG. 1C is a perspective view of a circuit board for an electronic deadbolt system.

FIG. 1C is a perspective view of a circuit board 112 for an electronic deadbolt system, such as that depicted in FIGS. 1A and 1B. Certain components are described above with regard to FIGS. 1A and 1B and are not necessarily described further. The circuit board 112 may be a substantially rigid substrate on which conductive tracks or leads are formed by known processes (e.g., etching). In other examples, the circuit board 112 may be manufactured from a flexible substrate. If a rigid substrate is used, the thickness of the substrate may be reduced in areas 168 bounded by dotted lines. By reducing the thickness of these areas 168, the substrate may be bent, folded, or otherwise manipulated so as to be formed into the configuration depicted in FIGS. 1A and 1B. In another example, these areas 168 may be manufactured of a flexible ribbon such as that described below, and connected to contacts 136, 138, and portions 130, 132. The leads formed on the substrate for signal transmission may be formed on the portions of the substrate that are not removed. After the thicknesses of areas 168 are reduced, the circuit board 112 may be inserted into the housing 102 in a specific operation and orientation, for example, the operation depicted in FIGS. 5-5F. In sum, this operation includes folding portions W and X into the configuration depicted in FIGS. 1A and 1B. The motor 144, the transfer gear set 120, the lead screw 124, the deadbolt 128, and related components are disposed between the motor contact 136 and first portion 130. This combination of elements is then inserted axially into the housing 102 and secured therein as required or desired. Prior to insertion, portions Y and Z may also be folded so as to be easily inserted along with the above combination of elements. This simplifies the manufacturing process.

The deadbolt system 100 may be utilized with standard keepers (typically disposed in the door frame opposite the door panel when closed), or may be used with an electronic keeper that may detect the extension of the deadbolt 128. These electronic keepers may be one of the keepers described in the following figures. Alternatively, one of the following keepers may be used with a particular type of deadbolt system that need not necessarily be electronic. That is, an electronic keeper may be utilized with a manual deadbolt. Various examples of electronic keepers are described below.

Figure 2A:
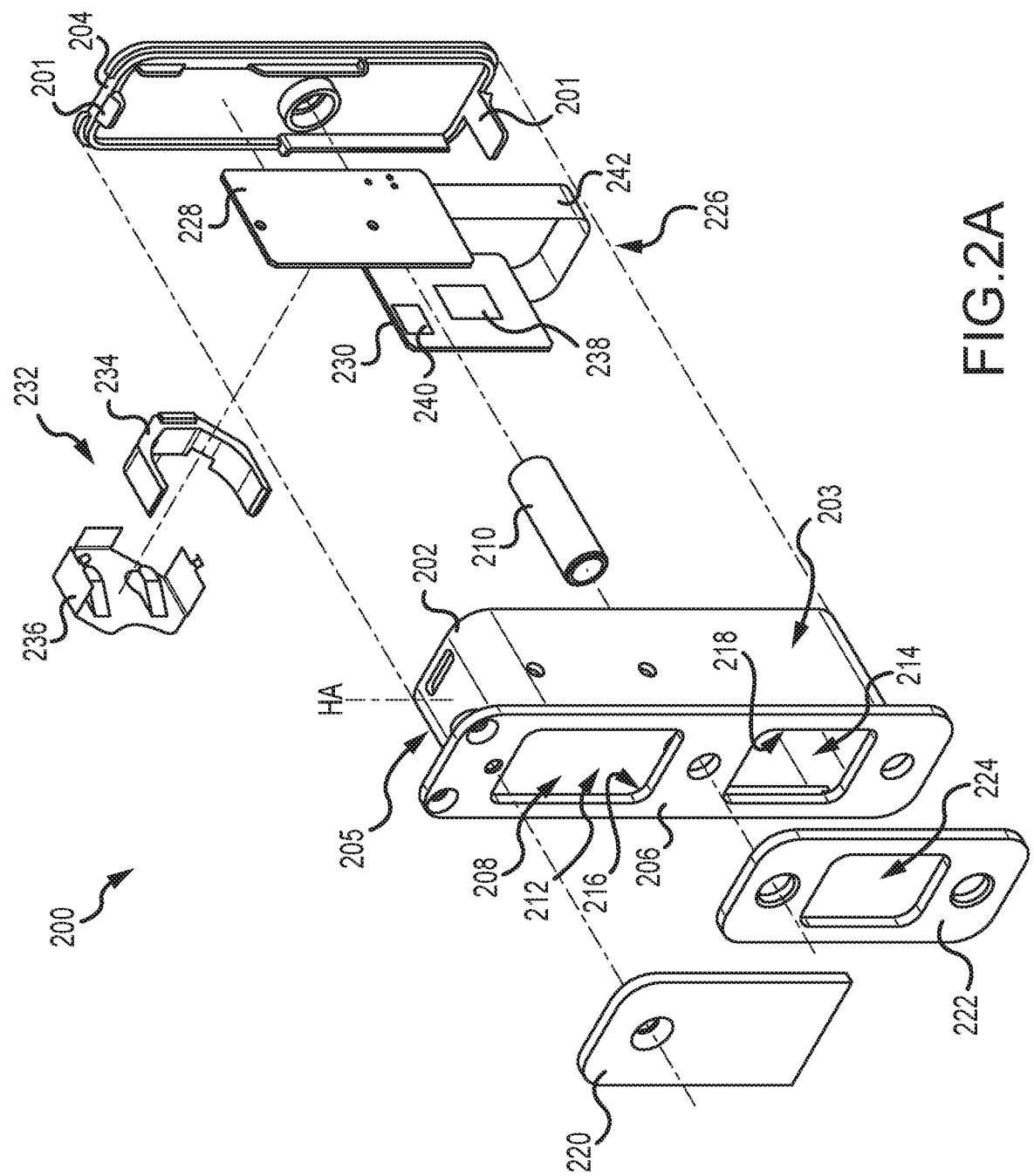
FIGS. 2A and 2B are exploded perspective and partial perspective views, respectively, of an electronic keeper in accordance with one example of the technology.
Figure 2B:
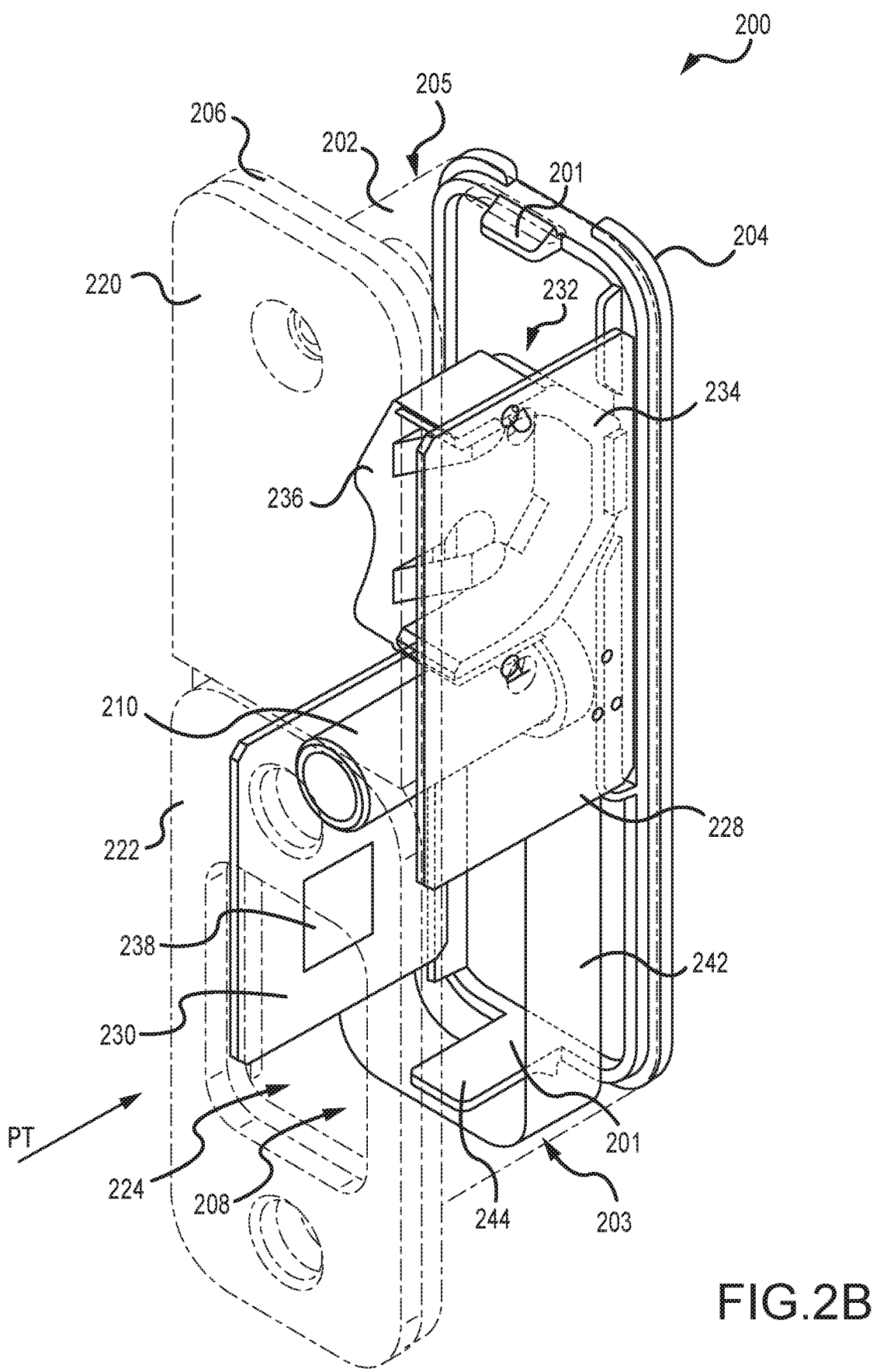

FIGS. 2A and 2B are exploded perspective and partial perspective views, respectively, of an electronic keeper 200 in accordance with one example of the technology, and are described concurrently. In FIG. 2B, an outer housing of the keeper is depicted in dashed lines so as to show the internal components thereof. This example of an electronic keeper 200 may be utilized on an entry door, for example, with the electronic deadbolt system 100 depicted in FIG. 1A-1B, or with a manually-operated deadbolt, as known in the art. The keeper 200 includes a housing 202 and a rear wall 204 that may be snap-fit or press-fit onto the housing 202 with tabs 201. In another example, the rear wall 204 may be secured to the housing 202 with mechanical fasteners or adhesives, or may be integral with the housing 202. A face plate 206 is connected to a side of the housing 202 opposite the rear wall 204 spanning from first 203 to second 205 sidewalls thereof. Thus, combined, the housing 202, rear wall 204, and faceplate 206 define an interior chamber 208 in which a number of other components are disposed, as described below. A post 210 or other support strut may span the interior chamber 208 from the rear wall 204 to the faceplate 206 and may act as a guide for a screw or other fastener (not shown) to secure the faceplate 206 and rear wall 204 to the housing 202. In the depicted keeper 200, the post 210 separates the interior chamber 208 into a battery chamber 212 above and a deadbolt-receiver chamber 214 below, although the post 210 need not completely isolate the chambers 212, 214 from each other. Additionally, the post 210 need not be utilized. The housing 202 also defines an elongate housing axis HA extending vertically through the interior chamber 208. The faceplate 206 defines a plurality of openings, specifically, a battery opening 216 disposed proximate the battery chamber 212 and a deadbolt-receiver opening 218 disposed proximate the deadbolt-receiver chamber 214. A cover plate 220 or battery door may be disposed so as to cover the battery opening 216, while a decorative plate 222 defining an opening 224 may frame the deadbolt-receiver opening 218.

A circuit board 226 is disposed within the interior chamber 208. The circuit board includes two sections or portions 228, 230 that are secured, e.g., to first 203 and second 205 sidewalls, respectively, of the housing 202. The first section 228 provides a mounting location for operational modules and components. For example, a battery holder 232 having a cradle 234 and cover 236 may be secured to the first portion 228. Thus, once installed, the battery holder 232 may be accessed by removing the cover plate 220 and removing/installing a battery, as required. The second section 230 provides a mounting location for other operational modules and components. For example, an RFID sensor 238 may be present, as may a communication module 240. Both components may be located so as to be substantially parallel to a path of travel PT of a deadbolt as it enters the opening 224. The RFID sensor 238 may be used to detect an RFID chip, for example, the chip installed in or on the deadbolt depicted in FIGS. 1A and 1B, when that deadbolt is disposed in the interior chamber 208. As such, when the RFID sensor 238 detects the RFID chip, the electronic keeper 200 may communicate this condition to the electronic deadbolt or to a remote application or system, e.g., via the communication module 240 or even a wired connection. Although an RFID sensor is depicted, other types of sensors, such as proximity sensors, magnetic sensors, or mechanical sensors such as pressure or contact sensors, may be utilized. Contact sensors may project into the path of travel PT.

The two sections or portions 228, 230 of the circuit board 226 are communicatively coupled via a flexible ribbon 242. The flexible ribbon 242 may be formed as described above for the circuit board 226 utilized in the electronic deadbolt of FIGS. 1A and 1B. That is, the substrate forming the circuit board 226 may be manufactured thinner in portions that will be bent or folded, or those portions may be reduced in thickness subsequent to manufacture. In another example, the flexible ribbon 242 may be manufactured of a material different than the first and second sections 228, 230, for example, flexible plastic substrates such as polyimide, PEEK, or transparent conductive polyester film. Additionally or alternatively, the flexible ribbon may be screen printed silver circuits on polyester. In another example, the entire circuit board 226 may be manufactured of a flexible substrate. In this depicted example of the electronic keeper 200, the first section 228 is disposed on a first side of the housing axis HA and in the battery chamber 212, while the second section 230 is disposed on an opposite side of the housing axis HA and in the deadbolt-receiving chamber 214. Moreover, FIG. 2B depicts that at least one of the tabs 201 may include an elongate portion 244 to help retain the flexible ribbon 242 against the housing 202, so as to prevent damage thereto, e.g., by contact with a deadbolt.

FIG. 2C is a perspective view of the circuit board 226 for the electronic keeper of FIGS. 2A and 2B. The particular configuration allows the circuit board 226 to be used across a wide variety of keeper configurations, thereby reducing manufacturing costs and factory storage requirements for components prior to manufacture. For example, the circuit board 226 is formed such that the modules and other components are disposed on a single side of the circuit board 226 when that circuit board 226 is in a flat configuration. That is, such components may be installed on a component face 244 of the first section 228 and a component face 246 of the second section 230, such that, when the flexible ribbon 242 is deformed (e.g., folded or bent) into the U-shaped configuration depicted in FIG. 2C, the component faces 244, 246 are facing towards the housing axis HA, and generally towards each other. In another example, the flexible ribbon 242 may be folded such that the section 230a is positioned substantially orthogonal to the elongate axis HA. In such a configuration, the ribbon 242 has an L-shape.

Figure 3A:
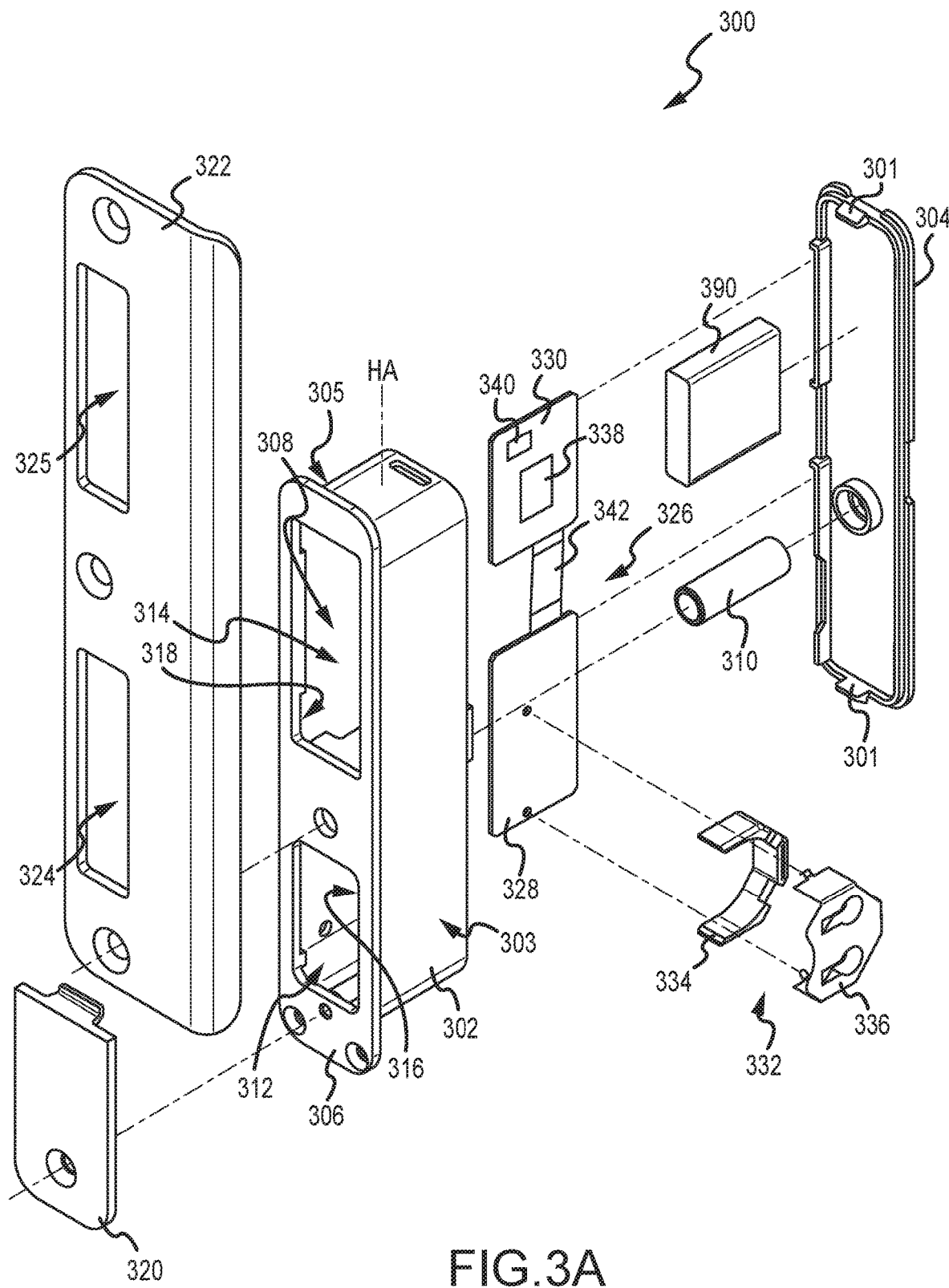
FIGS. 3A and 3B are exploded perspective and partial perspective views, respectively, of an electronic keeper in accordance with another example of the technology.
Figure 3B:
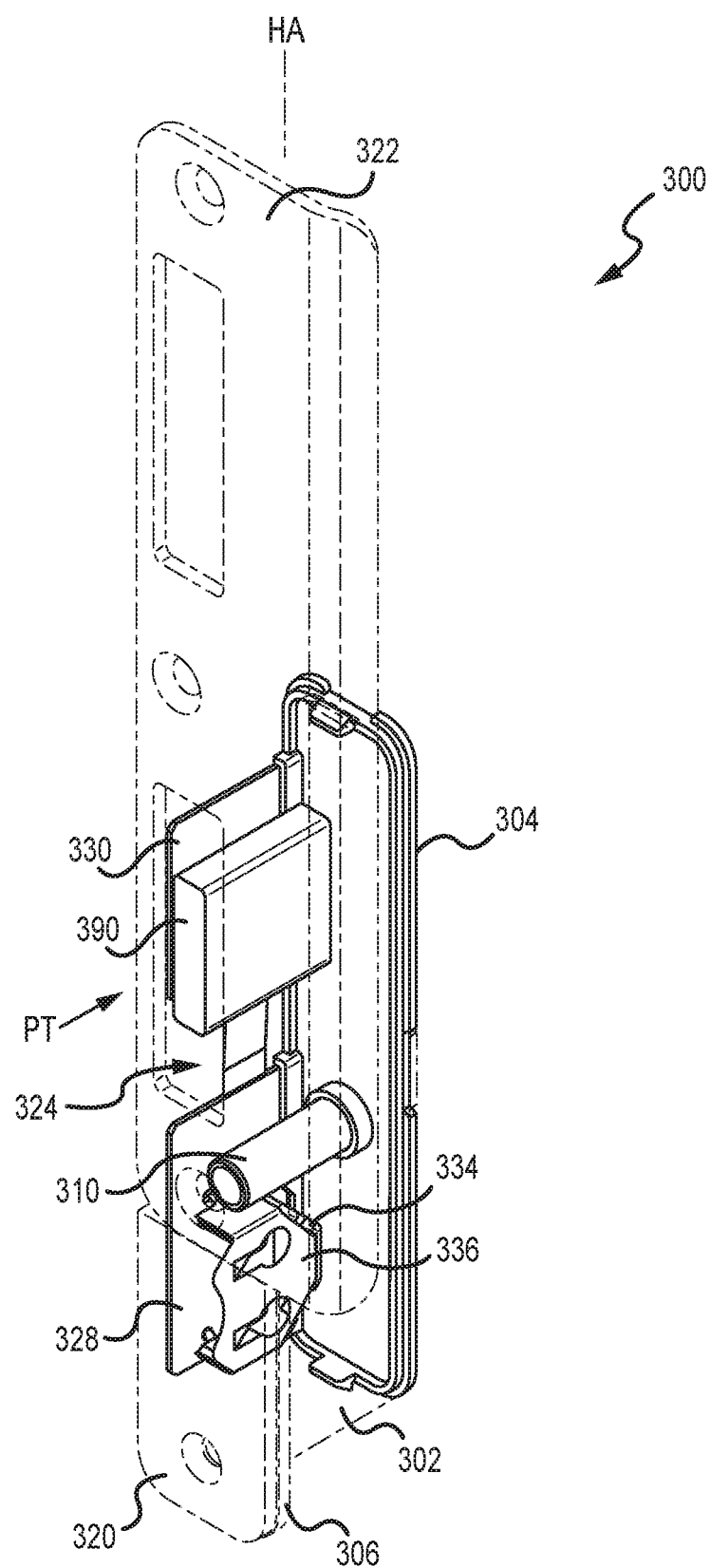

FIGS. 3A and 3B are exploded perspective and partial perspective views, respectively, of an electronic keeper 300 in accordance with another example of the technology. In FIG. 3B, an outer housing of the keeper is depicted in dashed lines so as to show the internal components thereof. This example of an electronic keeper 300 may be utilized with, for example, on a swinging patio door. Locks utilized on such a door include the P3000 lock from Amesbury Truth of Sioux Falls, S. Dak. The P3000 includes a manually-operated deadbolt as well as a spring-loaded latch. The keeper 300 includes a housing 302 and a rear wall 304 that may be snap-fit or press-fit onto the housing 302 with tabs 301. In another example, the rear wall 304 may be secured to the housing 302 with mechanical fasteners or adhesives, or may be integral with the housing 302. A face plate 306 is connected to a side of the housing 302 opposite the rear wall 304 spanning from first 303 to second 305 sidewalls thereof. Thus, combined, the housing 302, rear wall 304, and faceplate 306 define an interior chamber 308 in which a number of other components are disposed, as described below. A post 310 or other support strut may span the interior chamber 308 from the rear wall 304 to the faceplate 306 and may act as a guide for a screw or other fastener (not shown) to secure the faceplate 306 and rear wall 304 to the housing 302. In the depicted keeper 300, the post 310 separates the interior chamber 308 into a battery chamber 312 above and a deadbolt-receiver chamber 314 below, although the post 310 need not completely isolate the chambers 312, 314 from each other. The housing 302 also defines an elongate housing axis HA extending vertically through the interior chamber 308. The faceplate 306 defines a plurality of openings, specifically a battery opening 316 disposed proximate the battery chamber 312 and a deadbolt-receiver opening 318 disposed proximate the deadbolt-receiver chamber 314. A cover plate 320 or battery door may be disposed so as to cover the battery opening 316, while a decorative plate 322 defining an opening 324 may frame the deadbolt-receiver opening 318.

The configuration of the decorative plate 322 enables the keeper 300 to be utilized with the above-identified P3000 door lock. The opening 324 is, of course, aligned with the deadbolt-receiver opening 318. However, the decorative plate 322 also defines a latch opening 325 that allows for passage of the latch. This enables the door to be held shut without completely locking the door. Of course, decorative plates having different opening configurations may be utilized, depending on the type of lock utilized. As such, the keeper 300 may be utilized with the other locks, simply by changing the decorative plate size and/or configuration.

A circuit board 326 is disposed within the interior chamber 308. As above, the circuit board includes two sections or portions 328, 330. However, these are both secured to a second sidewall 205 of the housing 302. The first section 328 provides a mounting location for operational modules and components. For example, a battery holder 332 having a cradle 334 and cover 336 may be secured to the first portion 328. The second section 330 provides a mounting location for other operational modules and components, such as an RFID sensor 338 and a communication module 340. Both components may be located so as to be substantially parallel to a path of travel PT of a deadbolt as it enters the opening 324. A representative deadbolt 390 is depicted in FIGS. 3A and 3B. In 3B, notably, the position of the deadbolt 390 relative to the second section 330 is depicted. The RFID sensor 338 may be used to detect an RFID chip that may be installed in or on the deadbolt 390 when that deadbolt 390 is disposed in the interior chamber 308. Other types of sensors, such as proximity sensors, magnetic sensors, or mechanical sensors such as a pressure or contact sensor, may be utilized. Contact sensors may project into the path of travel PT.

The two sections or portions 328, 330 of the circuit board are communicatively coupled via a flexible ribbon 342 that may be formed as described above. In this depicted example of the electronic keeper 300, the first section 328 and second section 330 are both is disposed on a single side of the housing axis HA, but in the battery chamber 312 and in the deadbolt-receiving chamber 314, respectively.

Figure 3C:
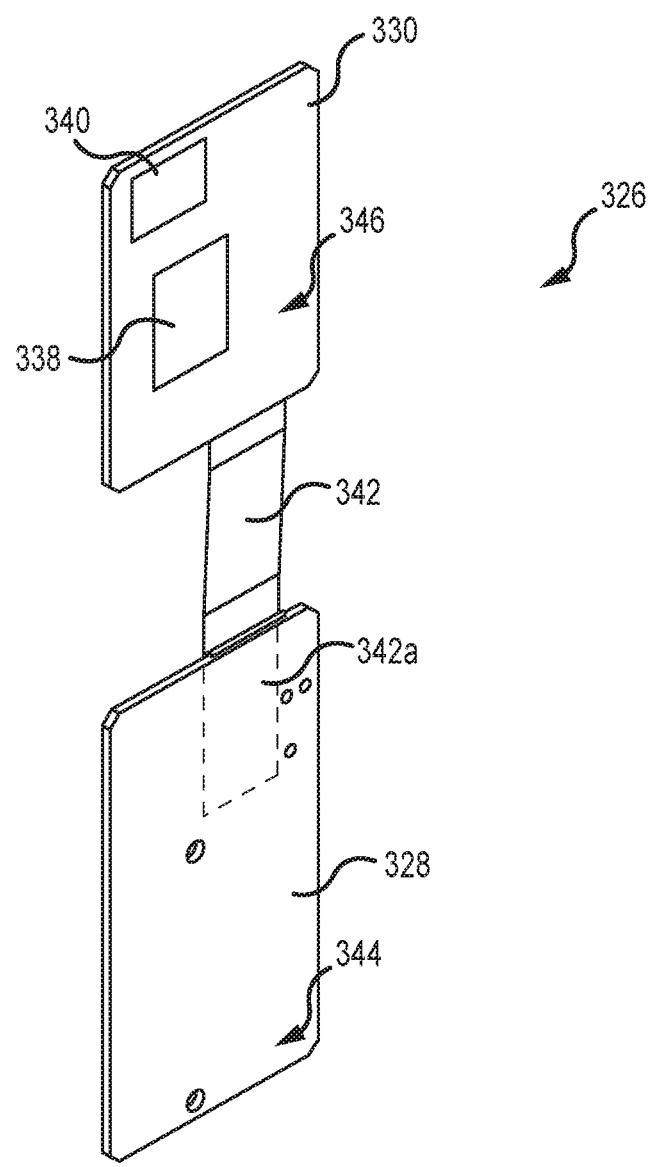
FIG. 3C is a perspective view of a circuit board for the electronic keeper of FIGS. 3A and 3B.

FIG. 3C is a perspective view of a circuit board for the electronic keeper of FIGS. 3A and 3B. The particular configuration allows the circuit board 326 to be used across a wide variety of keeper configurations, thereby reducing manufacturing costs and factory storage requirements for components prior to keeper manufacture. For example, the circuit board 326 is formed such that the modules, leads, and other components are disposed on a single side of the circuit board 326 when that circuit board 326 is in a flat configuration. That is, such components may be installed on a component face 344 of the first section 328 and a component face 346 of the second section 330. As such, when the flexible ribbon 342 is formed (e.g., folded or bent) into the configuration depicted in FIG. 3C, the component faces 344, 346 are facing towards the housing axis HA. A portion of 342a of the flexible ribbon 342 is folded behind the first section 328 so as to prevent damage thereto when installed. In another example, the flexible ribbon 342 may be folded into an L-shaped configuration such that the section 330a is positioned substantially orthogonal to the elongate axis HA, as described above.

Figure 4A:
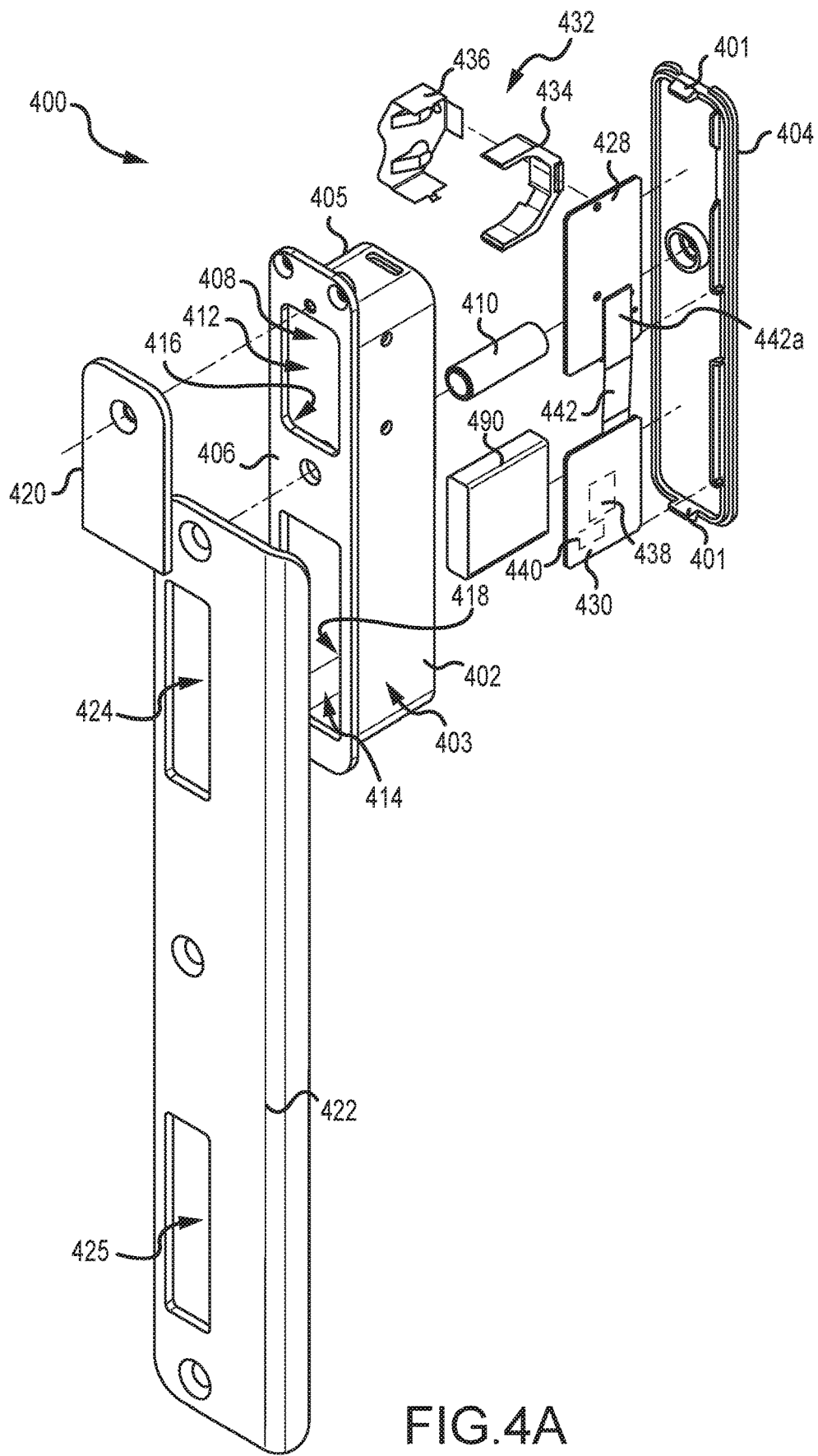
FIGS. 4A and 4B are exploded perspective and partial perspective views, respectively, of an electronic keeper in accordance with another example of the technology.
Figure 4B:
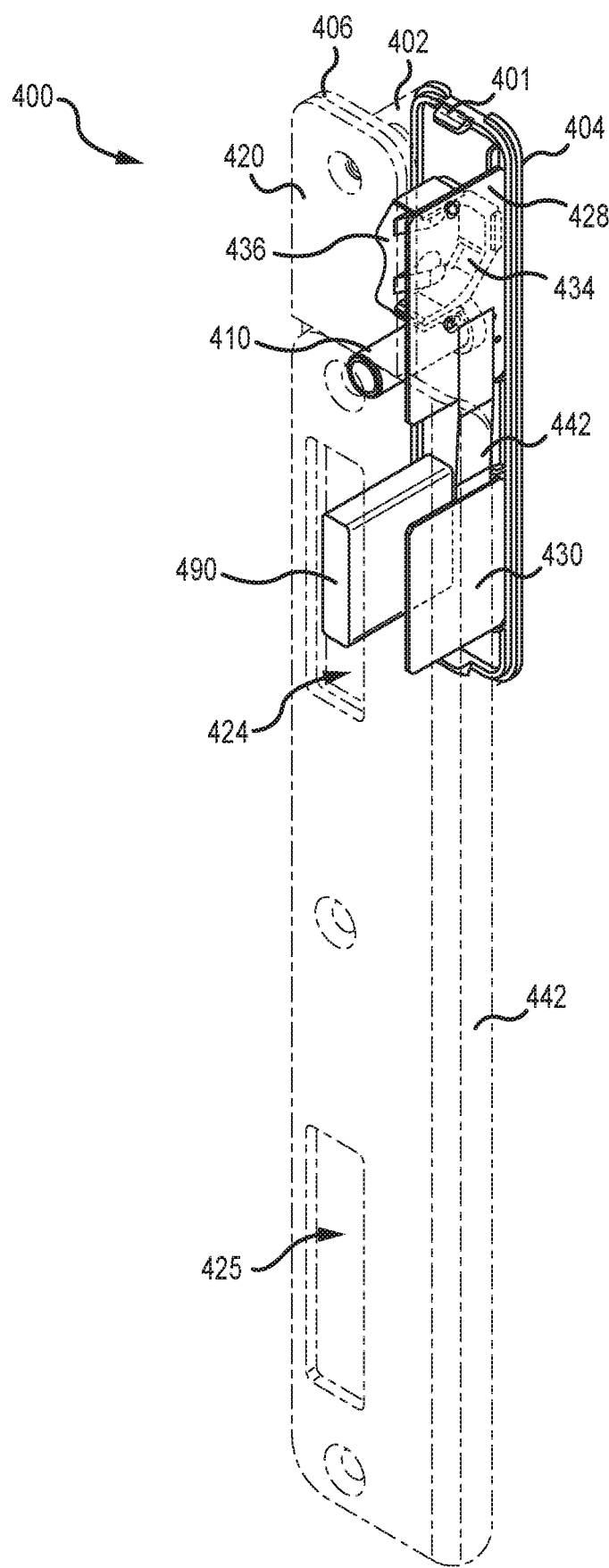

FIGS. 4A and 4B are exploded perspective and partial perspective views, respectively, of an electronic keeper 400 in accordance with another example of the technology. In FIG. 4B, an outer housing of the keeper is depicted in dashed lines so as to show the internal components thereof. This example of an electronic keeper 400 may be utilized with, for example, a swinging patio door and lock, such as the P2000 lock from Amesbury Truth. The P2000 includes a manually-operated deadbolt with a discrete spring-loaded latch. The keeper 400 includes a housing 402 and a rear wall 404 that may be snap-fit or press-fit onto the housing 402 with tabs 401. In another example, the rear wall 404 may be secured to the housing 402 with mechanical fasteners or adhesives, or may be integral with the housing 402. A face plate 406 is connected to a side of the housing 402 opposite the rear wall 404 spanning from first 403 to second 405 sidewalls thereof. Thus, combined, the housing 402, rear wall 404, and faceplate 406 define an interior chamber 408 in which a number of other components are disposed, as described below. A post 410 or other support strut may span the interior chamber 408 from the rear wall 404 to the faceplate 406 and may act as a guide for a screw or other fastener (not shown) to secure the faceplate 406 and rear wall 404 to the housing 402. In the depicted keeper 400, the post 410 separates the interior chamber 408 into a battery chamber 412 above and a deadbolt-receiver chamber 414 below, although the post 410 need not completely isolate the chambers 412, 414 from each other. The housing 402 also defines an elongate housing axis HA extending vertically through the interior chamber 408. The faceplate 406 defines a plurality of openings, specifically a battery opening 416 disposed proximate the battery chamber 412 and a deadbolt-receiver opening 418 disposed proximate the deadbolt-receiver chamber 414. A cover plate 420 or battery door may be disposed so as to cover the battery opening 416, while a decorative plate 422 defining an opening 424 may frame the deadbolt-receiver opening 418. As described above, altering a configuration of the decorative plate 422 allows this keeper 400 to be used with a variety of differently-configured locks, e.g., depending on location of the latch opening 425.

A circuit board 426 is disposed within the interior chamber 408. As above, the circuit board includes two sections or portions 428, 430 that are secured to a single sidewall 403 of the housing 402. The first section 428 provides a mounting location for operational modules and components. For example, a battery holder 432 having a cradle 434 and cover 436 may be secured to the first portion 428. The second section 430 provides a mounting location for other operational modules and components, such as, for example, an RFID sensor 438 and a communication module 440. Both components may be located so as to be substantially parallel to a path of travel PT of a deadbolt as it enters the opening 424. A representative deadbolt 490 is depicted in FIGS. 4A and 4B. In 4B, notably, the position of the deadbolt 490 relative to the second section 430 is depicted. The RFID sensor 438 may be used to detect an RFID chip on the deadbolt 490. Other types of sensors, such as proximity sensors, magnetic sensors, or mechanical sensors such as a pressure or contact sensor, may be utilized. Contact sensors may project into the path of travel PT.

The two sections or portions 428, 430 of the circuit board are communicatively coupled via a flexible ribbon 442 that may be formed as described above. In this depicted example of the electronic keeper 400, the first section 428 and second section 430 are disposed on a single side of the housing axis HA, and in the battery chamber but in different chambers 412, 414.

FIG. 4C is a perspective view of a circuit board for the electronic keeper of FIGS. 4A and 4B. The particular configuration allows the circuit board 426 to be used across a wide variety of keeper configurations, thereby reducing manufacturing costs and factory storage requirements for components prior to keeper manufacture. The ribbon 442 is folded as described above, such that a portion 442a is disposed behind the first portion 428.

FIG. 5 depicts a method 500 of manufacturing an electronic deadbolt system. FIGS. 5A-5F depict schematic side views of components of the electronic deadbolt system at various stages of manufacture. FIGS. 5-5F are described concurrently. The electronic deadbolt system may include components as described herein, such as a substantially cylindrical housing on elongate and a circuit board, etc. The housing may include a number of chambers defined by internal walls or other structures. The method 500 begins with providing an elongate circuit board 550, operation 502, depicted schematically in FIG. 5A. In operation 504, the circuit board 550 may be deformed or bent at a first location 1 as shown in FIG. 5B. This deformation can at least partially form the motor contact at the end of the ribbon, as described above in FIGS. 1A-1C. In another example, this first deformation need not be formed, if the motor contact is connected to, e.g., a bottom surface of a motor. A motor M and a deadbolt 552 (as well as the required or desired gears 554) are disposed proximate the circuit board 550 as shown in FIG. 5C, operation 506. In operations 508-512, the elongate circuit board 550 is deformed via folding or bending at second 2, third 3, and fourth 4 locations as depicted in FIG. 5D. The bending at the second 2 location is generally performed so as to provide clearance for the motor M, the deadbolt 552, and the gears 554. The bending at the second 2 and third 3 locations forms two parallel portions of the elongate circuit board 550. The elongate circuit board 550, motor M, deadbolt 552, and gears 554 are inserted I into a substantially cylindrical housing 556, e.g., via an open end, in operation 514. This is depicted in FIG. 5E. Once inserted, in operation 516, the motor M, deadbolt 552, and gears 554 are disposed generally in one chamber C1 of the housing 556, separated from another chamber C2 by the two parallel portions of the elongate circuit board 550. This is shown in FIG. 5F. Further, the motor M and deadbolt 552 may be further separated from each other into individual chambers by an internal structure or wall W.

Figure 6:
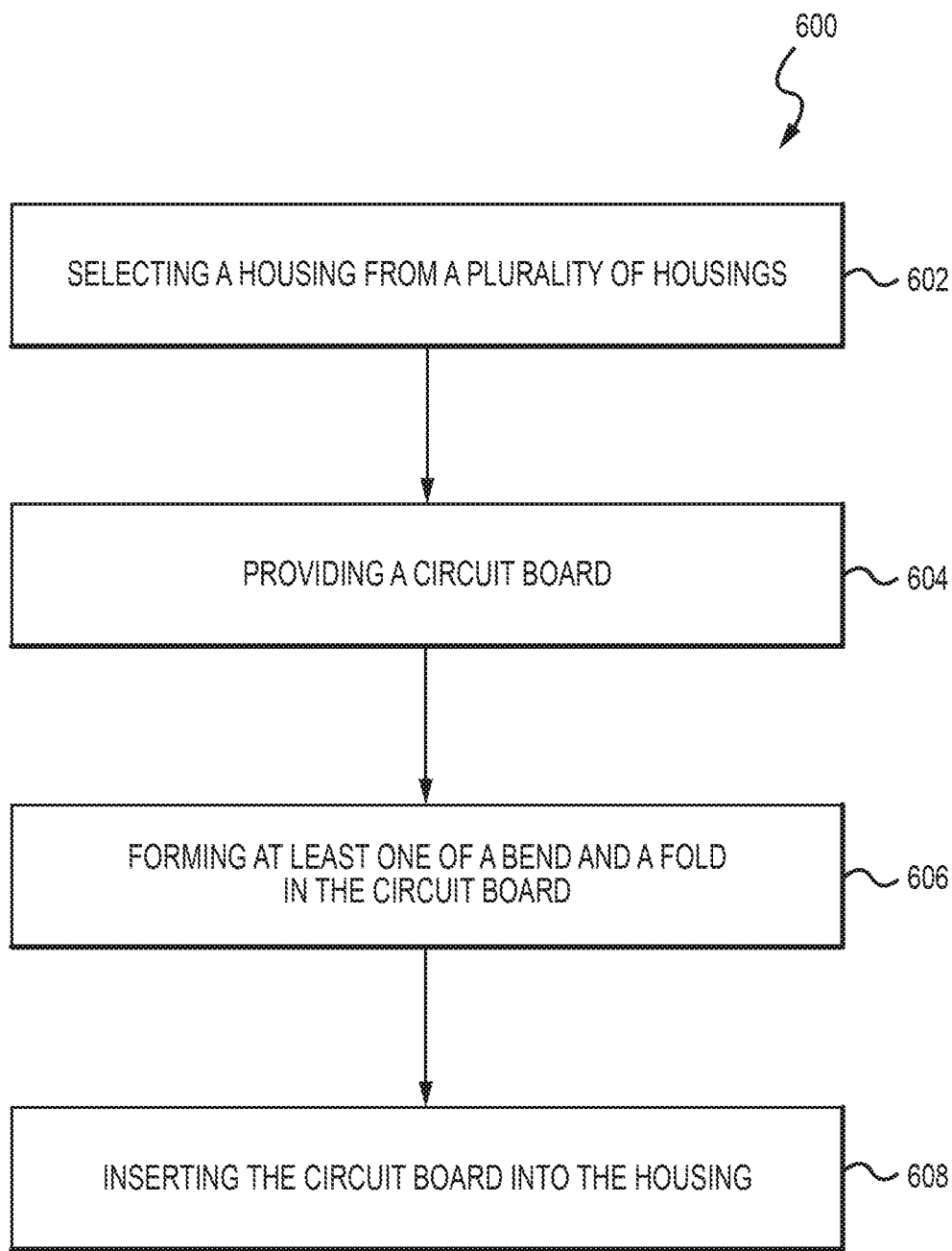
FIG. 6 depicts a method of manufacturing an electronic keeper.

FIG. 6 depicts a method 600 of manufacturing an electronic keeper. The keeper may be selected from any number of keeper housings having different lengths or configurations, as in operation 602. A circuit board is provided in operation 604. The circuit board may be the type depicted above; that is, the circuit board may have two portions connected by a flexible ribbon. Regardless of the housing selected, the length of the ribbon of the circuit board provided is the same. As described above, this enables a single circuit board configuration to be used across a wide range of keeper lengths and configurations. In operation 606, a bend or fold is formed in the circuit board, for example, in the ribbon thereof. Thereafter, the circuit board is inserted into the housing, operation 608, into discrete locations as required or desired for the particular housing.

Mechanical multi-point door lock systems are available in various configurations. Almost invariably, the mechanical multi-point lock systems include a main lock housing having more than one lock point extending therefrom, or a main lock housing connected via a linkage to one or more remote locking elements. Typically, in examples where a main lock housing has multiple lock points extending therefrom, the housing is often very bulky. In examples where a main lock housing is connected to remote locks via a linkage, the linkage must typically be installed in a so-called "Eurogroove" or elongate routed channel in an edge of the door. This linkage is then covered by a cover plate. Regardless of configuration, installation of a multi-point lock system is typically a complicated process, performed at a door manufacturing facility, or by a trained contractor. The electronic deadbolt and keeper systems described herein, however, can be positioned at various locations about a door panel so as to create a multi-point lock system, but without requiring complex installation procedures.

Figure 7:
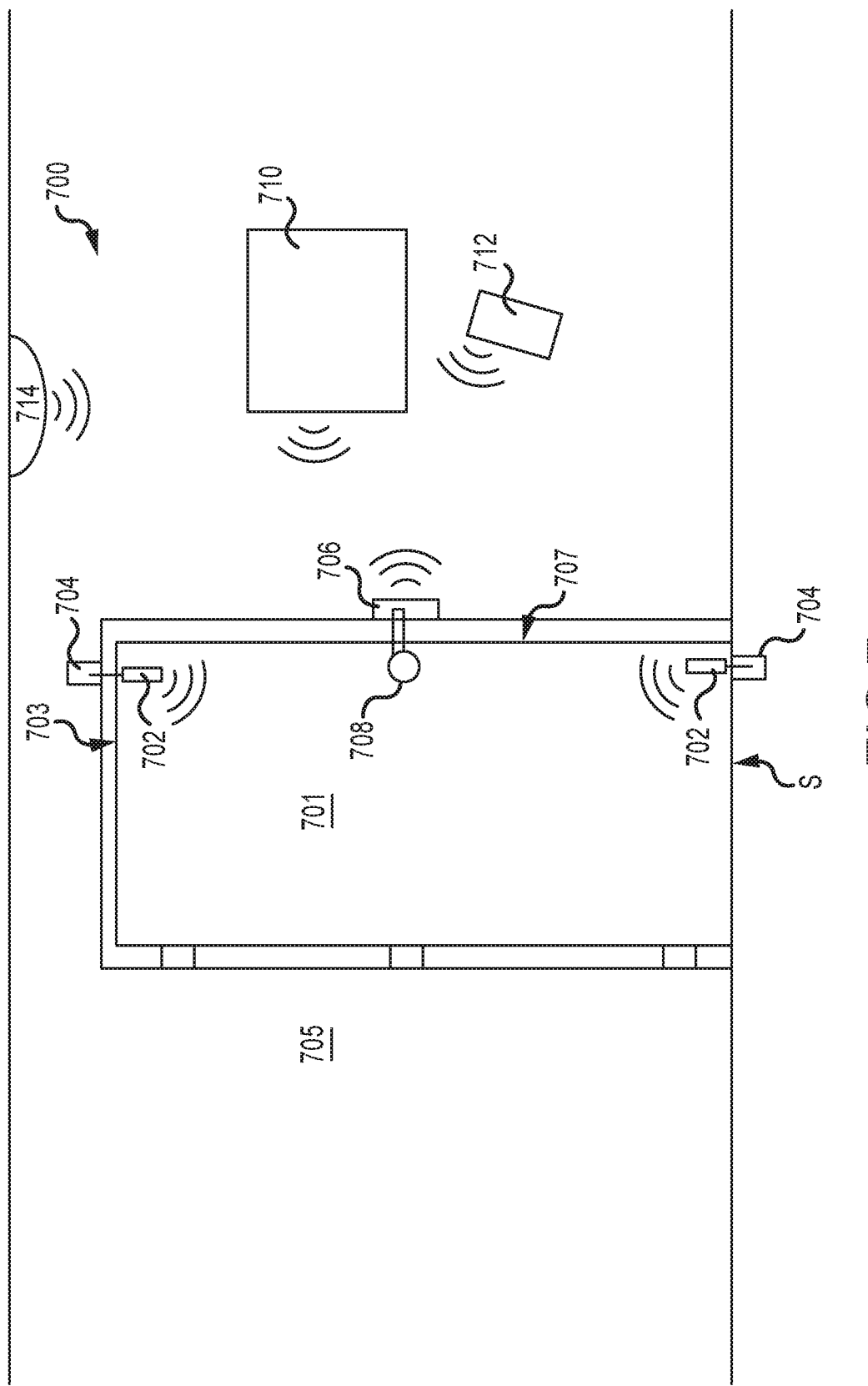
FIG. 7 depicts a schematic view of an electronic door lock system.

The electronic deadbolts and keepers described herein can be utilized in entry doors, sliding doors, pivoting patio doors, and other doors so as to create customized multi-point lock systems that are easy to install. FIG. 7 depicts a schematic view of one example of a multi-point electric door lock system 700 on a pivoting door. The system 700 includes two electronic deadbolt systems 702 installed in a door panel 701, for example, so as to extend into the head 703 and the sill S thereof. Alternatively, the electronic deadbolt 702 may be installed in the frame 705 so as to extend into the door 701. The placement and number of electronic deadbolt systems 702 may be altered as required or desired for a particular application. For example, in pivoting doors, the electronic deadbolts may be disposed so as to extend from the head 703, sill, S, or locking edge 707 of the door 701. In sliding patio doors, electronic deadbolts having linearly extending locking elements (as described herein) may extend from the head or sill of the sliding door. If utilized on the locking edge of a sliding door, the electronic deadbolt would require a hook-shaped locking element that would hook about a keeper so as to prevent retraction of the door. Each electronic deadbolt system 702 may be configured to as to extend into a keeper 704. Such keepers 704 may be standard keepers or the electronic keepers as described herein. The system 700 also includes an electronic keeper 706 configured to receive a standard (e.g., manually-actuated) deadbolt 708, as typically available on an entry or patio door.

In one configuration, once the deadbolt 708 is manually, the electronic keeper 706 detects a position of the deadbolt 708 therein. A signal may be sent to the remotely located electronic deadbolts 702, thus causing actuation thereof. At this point, the door 701 is now locked at multiple points. Unlocking of the manual deadbolt 708 is detected by the electronic keeper 706 (that is, the keeper 706 no longer detects the presence of the deadbolt 708 therein) and a signal is sent to the remote electronic deadbolts 702 causing retraction thereof, thus allowing the door to be opened. Thus, with minimal complexity, the electronic deadbolts and electronic keepers described herein may be utilized to create a robust multi-point locking system for a door, thus improving the security thereof.

In another example, the system 700 may include a controller/monitoring system, which may be a remote panel 710, which may be used to extend or retract the electronic deadbolts 702, or which may be used for communication between the various electronic keepers 704 and deadbolts 702. Alternatively or additionally, an application on a remote computer or smartphone 712 may take the place of, or supplement the remote panel 710. By utilizing a remote panel 710 and/or a smartphone 712, the electronic deadbolts 702 may be locked or unlocked remotely, thus providing multi-point locking ability without the requirement for manual actuation of a deadbolt. Additionally, any or all of the components (electronic deadbolt 702, keeper 706, panel 710, and smartphone 712) may communicate either directly or indirectly with a home monitoring or security system 714. The communication between components may be wireless, as depicted, or may be via wired systems.

The materials utilized in the manufacture of the lock and keepers described herein may be those typically utilized for lock manufacture, e.g., zinc, steel, aluminum, brass, stainless steel, etc. Molded plastics, such as PVC, polyethylene, etc., may be utilized for the various components. Material selection for most of the components may be based on the proposed use of the locking system. Appropriate materials may be selected for mounting systems used on particularly heavy panels, as well as on hinges subject to certain environmental conditions (e.g., moisture, corrosive atmospheres, etc.).

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An apparatus comprising:
    a housing comprising a first end and an opposite second end, wherein the first end and the second end define a housing axis;
    a face plate coupled to the first end of the housing so as to be substantially orthogonal to the housing axis;
    an end plate removeably coupled to the second end of the housing;
    a motor comprising a motor shaft comprising a motor shaft axis, wherein the motor is disposed in the housing;
    a lead screw comprising a lead screw axis, wherein the lead screw is rotatably mounted in the housing;
    a deadbolt configured to be linearly extended from the first end of the housing based on a rotation of the lead screw;
    a gear set comprising a plurality of gears, wherein each of the plurality of gears comprises a gear axis, and wherein the gear set is disposed in the housing and operably connecting the motor and the lead screw such that the motor controls the rotation of the lead screw;
    a circuit board comprising a plurality of portions communicatively connected by a ribbon, wherein the circuit board is disposed within the housing such that the motor, the lead screw, the deadbolt, and the gear set are positioned towards the first end of the housing and separated by the circuit board from the second end of the housing, wherein the plurality of portions of the circuit board prevents access to the motor, the lead screw, the deadbolt, and the gear set from the second end of the housing when the end plate is removed, and wherein the plurality of portions of the circuit board are each disposed substantially parallel to the face plate such that the housing axis, the motor shaft axis, the lead screw axis, and the plurality of gear axes are substantially orthogonal to the plurality of portions of the circuit board and the face plate; and a motor contact connected to at least one of the plurality of portions of the circuit board with a motor contact ribbon, wherein the motor contact is disposed within the housing and adjacent the first end, and the motor is disposed between the motor contact and the plurality of portions of the circuit board within the housing while being parallel to and offset from the motor contact ribbon.

2. The apparatus of claim 1, further comprising a power source disposed within the housing.

3. The apparatus of claim 2, wherein the power source comprises at least one battery comprising a first pole disposed at a first end of the at least one battery and a second pole disposed at a second end of the at least one battery, wherein the poles define a battery axis substantially orthogonal to the plurality of portions of the circuit board.

4. The apparatus of claim 3, wherein the at least one battery comprises a plurality of batteries, wherein the battery axes of the plurality of batteries are disposed parallel to each other.

5. The apparatus of claim 3, further comprising
a battery contact connected to at least one of the plurality of portions of the circuit board with a battery contact ribbon.

6. The apparatus of claim 5, wherein the plurality of portions of the circuit board comprises a first circuit board portion and a second circuit board portion, wherein the motor contact is connected to the first circuit board portion, and wherein the battery contact is connected to the second circuit board portion.

7. The apparatus of claim 6, wherein the motor contact is connected to the first circuit board portion with the motor contact ribbon and the battery contact is connected to the second circuit board portion with the battery contact ribbon.

8. The apparatus of claim 1, further comprising a communication module disposed between the plurality of portions of the circuit board and connected to at least one of the plurality of portions of the circuit board.

9. The apparatus of claim 1, further comprising a sensor disposed on at least one of the plurality of portions of the circuit board and configured to detect the rotation of the lead screw.

10. An apparatus comprising:
a face plate;
a substantially cylindrical housing having a first end and an opposite second end defining a housing axis, wherein the face plate is coupled to the first end and the housing defines a motor chamber, a deadbolt chamber, and a battery chamber;
an end plate removeably coupled to the second end;
a motor disposed in the motor chamber;
a deadbolt at least partially disposed in the deadbolt chamber;
one or more batteries replaceably disposed within the battery chamber;
a circuit board disposed within the housing, wherein the circuit board comprises a pair of parallel portions connected by a ribbon and the pair of parallel portions are substantially orthogonal to the housing axis, wherein the motor chamber and the deadbolt chamber are separated from the battery chamber along the housing axis by the pair of parallel portions of the circuit board connected by the ribbon, and wherein access between both the motor chamber and the deadbolt chamber and the battery chamber along the housing axis and within the substantially cylindrical housing is prevented via the pair of parallel portions of the circuit board connected by the ribbon; and
a battery contact disposed in the battery chamber adjacent the second end of the housing and connected to a first one of the pair of parallel portions disposed proximate the battery chamber by a flexible battery contact lead, wherein the one or more batteries are disposed between the battery contact and the first one of the pair of parallel portions while being parallel to and offset from the flexible battery contact lead.

11. The apparatus of claim 10, wherein the circuit board further comprises a motor contact disposed in the motor chamber.

12. The apparatus of claim 11, further comprising:
a motor contact lead connecting the motor contact to a second one of the pair of parallel portions disposed proximate the motor chamber and the deadbolt chamber.

13. The apparatus of claim 12, further comprising a lead screw at least partially disposed in the deadbolt chamber, wherein the deadbolt is operably connected to the lead screw such that a rotation of the lead screw via the motor extends the deadbolt away from the first second one of the pair of parallel portions.

14. The apparatus of claim 13, further comprising a sensor disposed on the first second one of the pair of parallel portions, wherein the sensor is configured to detect the rotation of the lead screw.

15. The apparatus of claim 13, further comprising a gear set operably connecting the motor and the lead screw.

* * * * *